(12) United States Patent
Iwamura et al.

(10) Patent No.: US 6,335,775 B1
(45) Date of Patent: *Jan. 1, 2002

(54) LIQUID CRYSTAL DEVICE HAVING LIQUID CRYSTAL ORIENTATION LAYERS INCLUDING REPETITIVE ASYMMETRICAL PROJECTS ALONG A PLURALITY OF GROOVES

(75) Inventors: Takashi Iwamura; Nobuhiro Kihara; Takeshi Yamasaki; Katsuya Shirai, all of Kanagawa; Keiichi Nito, Tokyo; Masanobu Yamamoto, Kanagawa; Akio Yasuda, Tokyo, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,100

(22) Filed: Sep. 26, 1996

(30) Foreign Application Priority Data

Sep. 29, 1995 (JP) ............................................... 7-276357
Jul. 12, 1996 (JP) ............................................... 8-203027

(51) Int. Cl.[7] ...................... G02F 1/1337; G02F 1/1339
(52) U.S. Cl. ...................... 349/125; 349/132; 349/134; 349/133; 349/156
(58) Field of Search ................................. 349/133, 132, 349/134, 125, 156

(56) References Cited

U.S. PATENT DOCUMENTS

| 4,043,647 | A | * | 8/1977 | Oue et al. ..................... 350/320 |
| 4,146,656 | A | * | 3/1979 | Kinugawa et al. ........... 427/109 |
| 4,521,080 | A | | 6/1985 | Funada et al. ............... 350/341 |
| 4,744,639 | A | * | 5/1988 | Tsuboyama .................. 350/350 |
| 5,438,421 | A | | 8/1995 | Sugawara et al. ............. 359/75 |
| 5,438,443 | A | * | 8/1995 | Taniguchi et al. ............. 359/81 |
| 5,583,680 | A | * | 12/1996 | Nakamura et al. ........... 349/134 |
| 5,607,732 | A | * | 3/1997 | Miyamoto et al. ........... 349/124 |
| 5,633,740 | A | * | 5/1997 | Asaoka et al. ............... 349/129 |
| 5,719,653 | A | * | 2/1998 | Minato et al. ............... 349/156 |

FOREIGN PATENT DOCUMENTS

WO    WO 96/24880    8/1996

* cited by examiner

Primary Examiner—William L. Sikes
Assistant Examiner—Julie Ngo
(74) Attorney, Agent, or Firm—Bell, Boyd & Lloyd LLC

(57) ABSTRACT

In a liquid crystal device in which a pair of substrates each having an electrode and a liquid crystal orientation control layer are disposed opposite to each other leaving a predetermined gap therebetween and liquid crystal is disposed in the gap, a plurality of grooves are formed on each of the inner surface contacting the liquid crystal, the section of the inner surfaces in a direction along the grooves has such a shape that repetitive asymmetrical projections are formed and the radius of curvature of the grooves in a direction intersecting the grooves is set to 0.1 μm or more.

16 Claims, 38 Drawing Sheets

A-A CROSS SECTION

PRIOR ART

PRIOR ART

STATE 0 (VIEWED FROM UPPER SIDE OF SUBSTRATE)

STATE 0

A-A CROSS SECTION

B-B CROSS SECTION

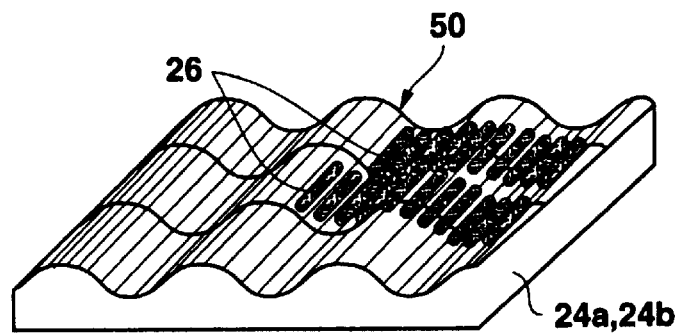
FIG. 10A
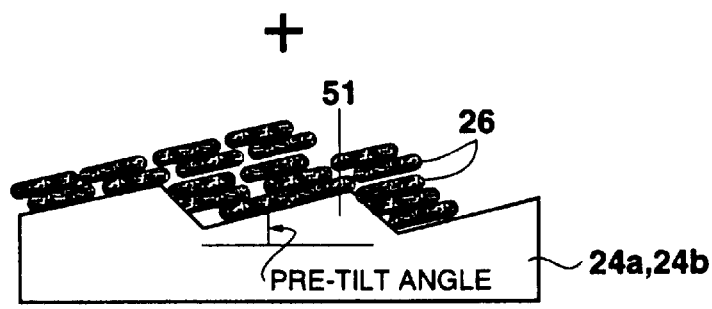
FIG. 10B
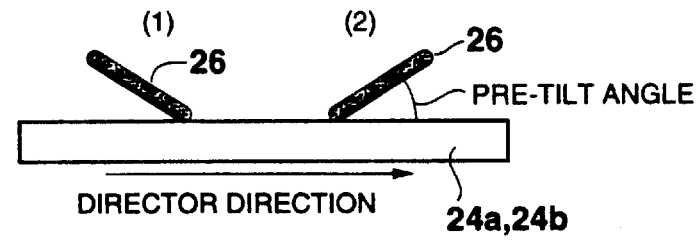
FIG. 10C
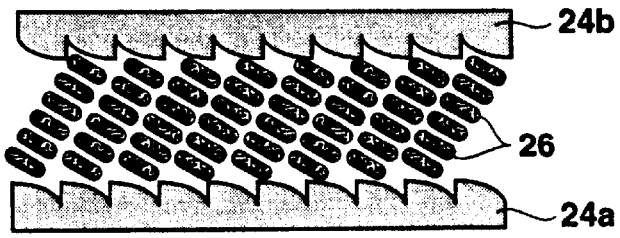

FIG. 46A
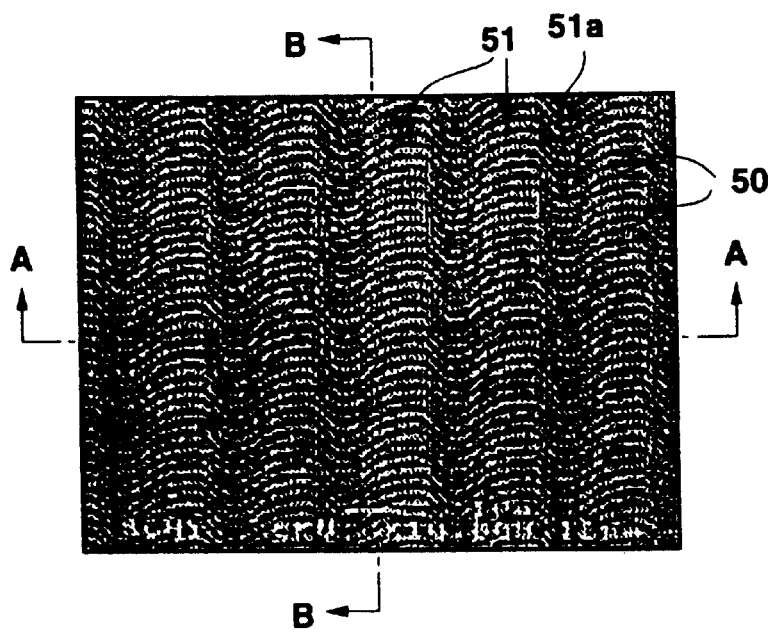
FIG. 46B
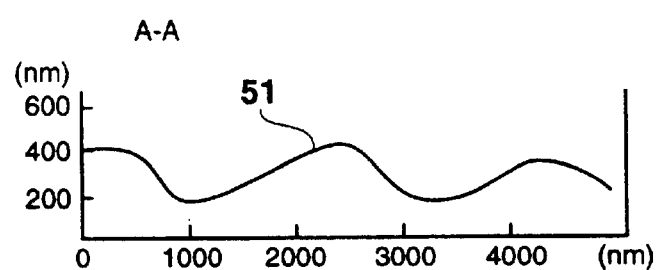
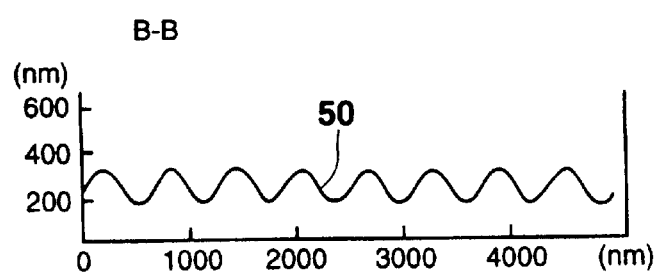

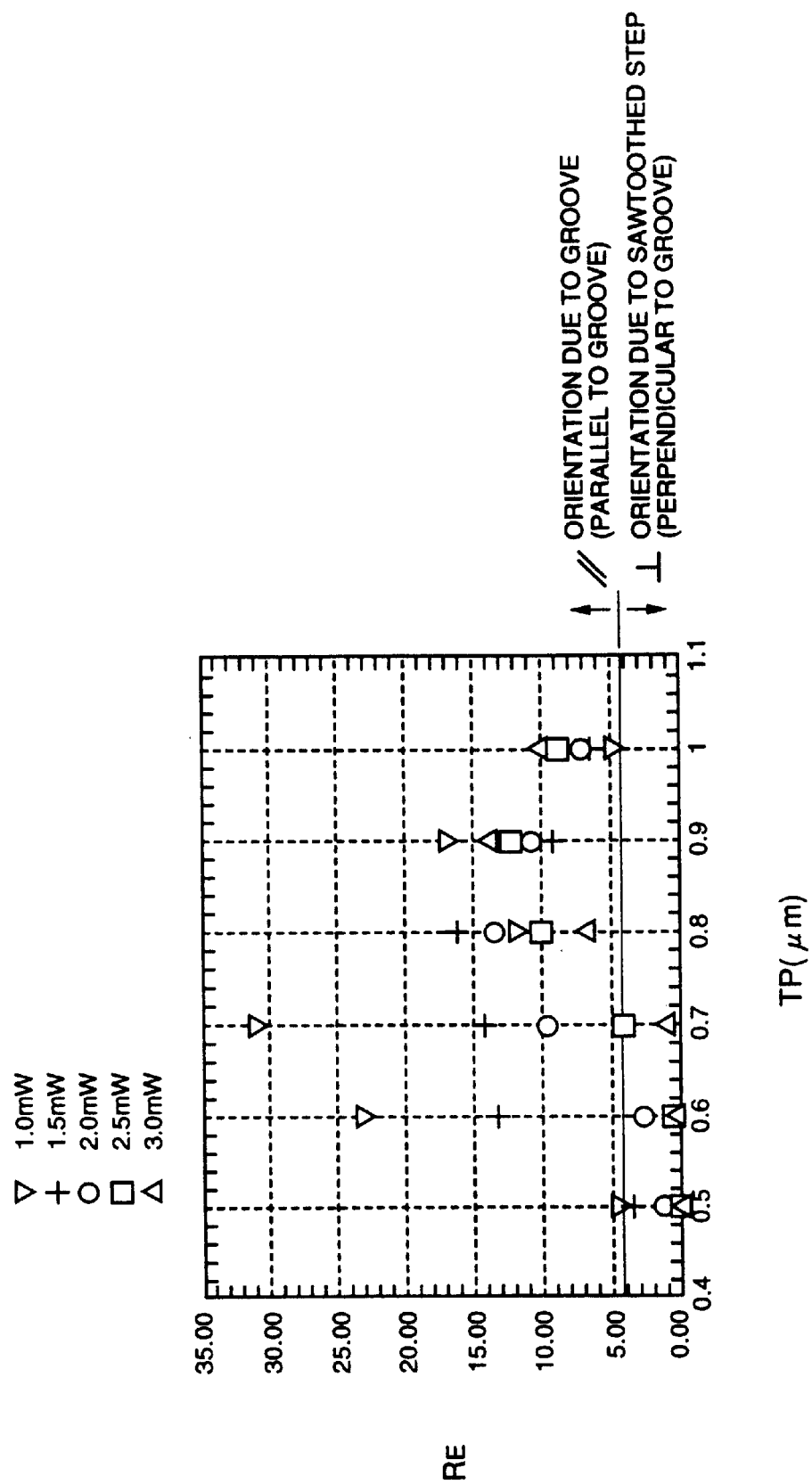

LIQUID CRYSTAL DEVICE HAVING LIQUID CRYSTAL ORIENTATION LAYERS INCLUDING REPETITIVE ASYMMETRICAL PROJECTS ALONG A PLURALITY OF GROOVES

BACKGROUND OF THE INVENTION

The present invention relates to a liquid crystal device in which a liquid crystal composition is disposed in a gap between a pair of substrates each provided with an electrode and a liquid crystal orientation control layer (particularly, a liquid crystal display device in which a pair of substrates each provided with a transparent electrode and an orientation film in that order are disposed opposite to each other leaving a predetermined gap therebetween and a ferroelectric liquid crystal composition is disposed in the gap) and a manufacturing method therefor.

Recently, studies and developments on application of ferroelectric liquid crystal (FLC; ferroelectric liquid crystal) showing bistability to display devices have been actively promoted. FLC displays are excellent display means having mainly the following features (1) to (3):

(1) High-speed response (1000 times as high as that of the conventional nematic liquid crystal display).

(2) Little visibility angle dependency.

(3) Image memory effect.

Since the ferroelectric liquid crystal display in a bistable mode has a memory effect, it can suppress flicker which is a problem in a CRT (Cathode Ray Tube) or the like, and it can be driven with scanning lines of 1000 or more even by a simple X-Y matrix driving system (driving with TFT: thin film transistors becomes unnecessary). In addition, nematic liquid crystal which is mainly used at present has a problem that its angle of visibility is small, however, the ferroelectric liquid crystal has an advantage that it has a broad angle of visibility because it has uniform molecular orientation and its panel gap is equal to or less than one half of that of a nematic liquid crystal panel.

The FLC display device (ferroelectric liquid crystal display device) 1 using such ferroelectric liquid crystal as described above has a cell structure which is schematically shown in FIGS. 1 and 2, for example. The cell structure 1 shown in FIGS. 1 and 2 mainly comprises a laminate 1A and a laminate 1b. The laminate 1A is formed by successively laminating, on the inner surface of a transparent substrate 2a of glass or the like, a transparent electrode layer 3a such as ITO (indium tin oxide: conductive oxide formed of indium doped with tin) or the like and an SiO oblique deposition layer 4a serving as a liquid crystal orientation film which has a high contrast and achieves excellent domains, and the laminate 1B which is formed by successively laminating, on the inner surface of a substrate 2a of glass or the like, a transparent electrode layer 3b and an SiO oblique deposition layer 4b. The laminates 1A and 1B are disposed so that the SiO oblique deposition layers 4a and 4b serving as the liquid crystal orientation films, and then granular spacers 5 are sandwiched between the laminates 1A and 1B to achieve a predetermined cell gap d, whereby a liquid crystal cell is fabricated. The peripheral portion of the cell is sealed with an adhesive 7 and the ferroelectric liquid crystal 8 is filled into the cell gap through the inlet port 7a and the peripheral portion of the cell is sealed with an adhesive.

For the liquid crystal orientation films 4a, 4b, there has conventionally been used an oblique deposition film of SiO, a rubbing film of polyimide or the like. Particularly, the rubbing film is practically and widely used as an orientation film for liquid crystal display devices at present. When the rubbing film is used as an orientation film, it enhances productivity and facilitates a large-area design. Therefore, at present, many liquid crystal display devices in which rubbing films are used as orientation films have been industrially produced.

However, the rubbing film causes dust to generate at the rubbing time and thus defective picture elements are liable to occur. Further, it is difficult with the rubbing film to provide a pre-tilt angle, and thus there occurs a problem that without such pre-tilt angle, picture elements become defective resulting in reducing the degree of contrast.

On the other hand, when the SiO oblique deposition film is used as the orientation film, it is difficult that pillars to determine the orientation of the liquid crystal are formed uniformly and to a large area. Further, due to the use of a vacuum deposition method, there arises the problem of bad productivity.

The SiO oblique deposition film can be manufactured by a method which is schematically shown in FIG. 3. That is, in a vacuum deposition device 35, a deposition source 37 is disposed substantially spotlike in a vacuum chamber 36, and the deposition is performed while an angle $\theta_1$ of intersection between a line 38 connecting the deposition source 37 and the substrate 2a or 2b serving as a deposition position and a normal 39 of a deposition plane is set to about 85 degrees (the substrate 2a (2b) is disposed within ±θ (for example, ±5°) with respect to the upward and perpendicular direction of the deposition source 37).

A vacuum pump 41 is linked to the vacuum chamber 36 through a vacuum valve 40, and a predetermined vacuum degree is achieved under evacuation of the pump. Nitrogen gas is introduced into the vacuum chamber 36 through the vacuum valve 40 in a purging process. The deposition source 37 having SiO 24 mounted in a deposition boat 43 is based on a resistance heating method which applies electric current between resistance heating electrodes 42, and a deposition speed is controlled by utilizing feedback from a quartz oscillator type thickness monitor 44.

However, in the case of the above-described oblique deposition method, the precision of the angle $\theta_1$ must be within several degrees in order to make the structure of the SiO oblique deposition film uniform (that is, in order to obtain uniform crystal orientation). The distance between the deposition source 37 and the deposition portion 2a (2b) affects the shape of the SiO pillars. Therefore, as the substrate 2a (2b) becomes large-sized, the deposition direction is diffused with a solid angle. Therefore, the angle of intersection between the deposition direction and the substrate and the distance from the deposition source are different between the edge and the center of the substrate. As a result, the structure of the oblique deposition film becomes ununiform, and the orientation characteristic does not become uniform, too.

By increasing the distance between the deposition source and the substrate as the substrate becomes large-sized, the problem of the angle or the distance between the two can be temporarily solved. However, in order to increase the distance between the deposition source and the substrate, the chamber of the deposition apparatus must be made large and also the vacuum degree must be increased, resulting in reducing the productivity to a great degree.

Therefore, it has been attempted for a long time that the orientation of the liquid crystal is controlled on the basis of the shape of the surface of the orientation film.

For example, there is a technique in which in consideration of the recognition that the liquid crystal orientation regulating force of a rubbing film is dependent on fine irregularities formed on the surface of the rubbing film or the molecular orientation of the rubbing film, the former effect is modeled and used. As described above, the orientation of the liquid crystal by providing the groove-shaped structure on the surface of the film, and its theoretical interpretation are reported in Physical Review A 24, 5, 2713–2719, (1981), Molecular Crystals and Liquid Crystals 23, 215–231, (1973), Liquid Crystals, 16,6, 1027–1036, (1994), Japanese Journal of Applied Physics 23, 2, 137–141, (1984), Journal of Applied Physics 73, 7, 3299–3304, (1993), or the like.

Besides, it has been attempted that liquid crystal orientation is controlled according to the fine shape of the film. However, a method using photoresist (Japanese Laid-open Patent Application No. Hei-3-296721, Japanese Laid-open Patent Application No. Hei-4-324426) is unsuitable for mass production because it does not adopt a replica technique such as an ultraviolet-rays hardening resin method, an injection molding method or the like.

In Japanese Laid-open Patent Application No. Hei-5-249465, it is proposed that a structure 45 having a sawtoothed section is provided on the surface of the orientation film 46 to provide a pre-tilt angle to the ferroelectric liquid crystal molecule 6 indicated by a virtual line in FIG. 4.

However, according to the knowledge of the present inventors, it is likely that with only the above-mentioned sawtoothed structure 45, liquid crystal molecules 6 are oriented along step portions 45a of the sawtooth (in a direction perpendicular to the sheet surface in FIG. 4) when an orientation film material of horizontal orientation (for example, polyvinyl alcohol) is used so that the pre-tilt angle cannot be provided. As a consequence, the contrast is not improved and the bistability which is the merit of the ferroelectric liquid crystal cannot be obtained.

Further, when a material of vertical orientation (for example, material formed of polytetrafluoroethylene) is used as the orientation film, the liquid crystal molecules 6 are oriented only vertically like the case where no sawtooth is provided if the tilt angle of the slant surface of the sawtoothed structure exceeds about 30 degrees. If the tilt angle of the slant surface of the sawtoothed structure 45 is below about 30 degrees, the liquid crystal molecules becomes inclined to some degree from the vertical orientation so that although the molecules are uniaxial oriented they have no storage property. Therefore, there is a problem that no switching characteristic is obtained, and there is a demerit when applied to the ferroelectric liquid crystal.

On the other hand, Japanese Laid-open Patent Application No. Hei-5-188377 discloses a method of providing a groove-shaped structure on the surface of an orientation film to uniaxially orient nematic liquid crystal, and at the same time, design the section parallel to the grooves in a sawtoothed structure, thereby providing a pre-tilt angle.

In this well-known technique, since the grooves are formed by using interference of laser beams (holography), a large-sized orientation film is not obtained, but it is expected that a device having an excellent orientation characteristic and a normal degree of switching characteristic can be provided when this technique is applied to a liquid crystal device using nematic liquid crystal and TFTs (thin film transistors) in combination.

However, as a result of investigation by the present inventors, it has been found out that in case where a combination of the orientation film of the well-known technique and the ferroelectric liquid crystal is used, if TFTs are used, a switching operation can be performed but if a simple matrix is used, the switching operation cannot be expected by actual application of a voltage thereto although the liquid crystal composition is oriented.

SUMMARY OF THE INVENTION

An object of the present invention is to provide a liquid crystal device which can solve the above problems, and has excellent characteristics (particularly, a ferroelectric liquid crystal device having an excellent contrast and can be made large-sized with ease), and also to provide a method which can easily manufacture such liquid crystal device in a short time and at low cost.

In order to solve the above problems, the present inventors have found out that in an orientation film which has on the surface thereof grooves and a sawtoothed structure along the grooves, the radius of curvature of the grooves is the main cause of affecting the switching operation of the ferroelectric liquid crystal, discovered an effective countermeasure, and achieved the present invention.

That is, according to the present invention, a liquid crystal device in which a pair of substrates each having an electrode and a liquid crystal orientation control layer are disposed in opposite relationship with each other leaving a predetermined gap therebetween and liquid crystal is disposed in the gap, wherein a plurality of grooves are formed on each of the inner surfaces of the substrates contacting the liquid crystal, the inner surface has a section forming repetitive asymmetrical projections in a direction along the grooves and the radius of curvature of the groove in a direction intersecting the groove is 0.1 µm or more.

As a method of manufacturing the liquid crystal device of the present invention, a master (mold) for forming the grooves and the projections is preferably formed by a cutting method using laser irradiation.

The present inventors have made the following various investigations in the process of achieving the liquid crystal device and its manufacturing method of the present invention.

The present inventors formed a ferroelectric liquid crystal device having an orientation film (hereinafter referred to as an orientation film X) as disclosed in the Japanese Laid-open Patent Application No. Hei-5-188377. However, the different point from the liquid crystal devices disclosed in the Japanese Laid-open Patent Application No. Hei-5-188377 resides in that a simple matrix system is used, the gap between glass substrates is set to 1.5 µm in order to apply ferroelectric liquid crystal and the ferroelectric liquid crystal is used in place of nematic liquid crystal.

A driving operation of the liquid crystal device thus formed was tried to be driven, however, it showed no switching operation even by applying a voltage of ±50 V. The direction of orientation of the liquid crystal was parallel to the direction of the grooves on the substrate.

Normally, in the ferroelectric liquid crystal, the orientation direction of the liquid crystal molecules 6 is switched between two states 1 and 2 in smectic phase with respect to an interaction between an externally applied electric field E and a spontaneous polarization Ps as shown in FIG. 5. Viewing the device from right above, the center axis of a circular cone which is virtually shown in FIG. 5 coincides with the direction of the orientation film (the rubbing direction for a rubbing film, the deposition direction for an SiO oblique deposition film).

However, in the liquid crystal device as described above, the orientation direction of the molecules of the ferroelectric liquid crystal itself is coincident with the direction of the orientation film (the direction of the grooves) (referred to as a state 0) as shown in FIG. 6, and neither the state 1 nor the state 2 appears. This means that the energy in the state 0 is lower than the energy in the state 1 and the energy in the state 2.

Therefore, the present inventor considered that the orientation regulating force of the grooves of the orientation film X to the liquid crystal molecules was strong, and the stabilization of the energy of the orientation regulating force in the state 0 was larger than the stabilization (states 1,2) of the energy based on the interaction between the ferroelectric liquid crystal and the electric field when the electric field was applied. On the basis of this recognition, the present inventors tried to weaken the orientation regulating force of the orientation film and perform the switching operation of the liquid crystal molecules as much as possible.

The formation of grooves on an orientation film as described above has hitherto been performed by using the interference of laser beams (holography). This method has had a problem that an orientation film having a large-area pattern cannot be formed because an area where a holograph is obtained is narrow. In addition, from the point of view of control of the orientation regulating force of the orientation film, there is a problem that the controllability of the shape is low. When the holographic technique is used, the width and depth of the grooves are parameters which can be controlled. The sawtoothed structure must be formed by another method.

Therefore, the applicant has considered another method of forming the shape of the orientation film by scanning laser beams while modulating the laser beams by AOM (Acoustic-Optic Modulator). With this method, the grooves and the sawtoothed section can be formed at the same time by varying a modulation pattern of the AOM, the γ-characteristic of the resist being used, the wavelength and focus of the laser, etc., and in addition, the pitch and angle of the sawtoothed structure, the width and depth of the grooves, and the sectional shape (the radius of curvature of projections and recess portions of the grooves) can be controlled.

As a result of investigation of the shape of the orientation film as described above, the present inventors have found out that the sectional shape of the grooves, particularly the minimum radius of curvature of the recess portions of the grooves in a direction perpendicular to the longitudinal direction of the grooves gives an adverse effect on the switching operation of the ferroelectric liquid crystal. That is, it has been found out that the minimum radius of curvature of the recess portions of the grooves of the orientation film formed by the holography is so small that the switching operation of the liquid crystal molecules is adversely affected.

At the same time, it has been found out that there is sometimes a case where when the minimum radius of curvature of the recess portions of the grooves is so set as to allow the switching operation to be performed, the liquid molecules are not oriented in the direction of the grooves, but oriented along step portions formed by the sawtoothed structure (in a direction perpendicular to the grooves).

Therefore, the present inventors have investigated the balance between the orientation force due to asymmetrical projections like the sawtoothed structure and the orientation force due to the grooves, and sought a condition required for the liquid crystal molecules to be oriented in the direction of the grooves while the liquid crystal molecules keep pre-tilt. As this condition, the grooves is indispensably formed so that the recess portions of the grooves in a direction intersecting (particularly in a direction perpendicular to) the longitudinal direction of the grooves has the minimum radius of curvature of 0.1 μm or more.

That is, since the orientation regulating force of the liquid crystal molecules by the grooves can be controlled by the radius of curvature in the specific range as described above, the switching operation of the liquid crystal molecules is facilitated, and the liquid crystal molecules are not oriented along the steps of the asymmetrical projections like the sawtoothed structure. In addition, the liquid crystal molecules can be oriented at a desired pre-tilt angle along the grooves by the projections as described above. Particularly for the ferroelectric liquid crystal, the switching operation can be easily performed at a desired cone angle on the surface of the circular cone shown in FIG. 5.

BRIEF DESCRIPTION OF THE DRAWINGS

FIG. 10A is a schematic perspective view showing the action of the surface shape of the orientation film of the liquid crystal display device together with a cross-sectional view;

FIG. 10B is a schematic view illustrating orientation states of the liquid crystal molecules;

FIG. 10C is a schematic view illustrating a liquid crystal showing a bookshelf structure;

FIG. 46A is an SEM image of the surface shape of the orientation film of the liquid crystal display device according to the present invention;

FIG. 46B is a detected STM image;

FIG. 47 is a graph comparatively showing the relationship between the groove pitch (TP) of the surface of the orientation film in the liquid crystal display device and $R_E$ serving as an estimation parameter for the liquid crystal orientation every laser power in the cutting process;

DETAILED DESCRIPTION OF PREFERRED EMBODIMENTS

Figure 1:
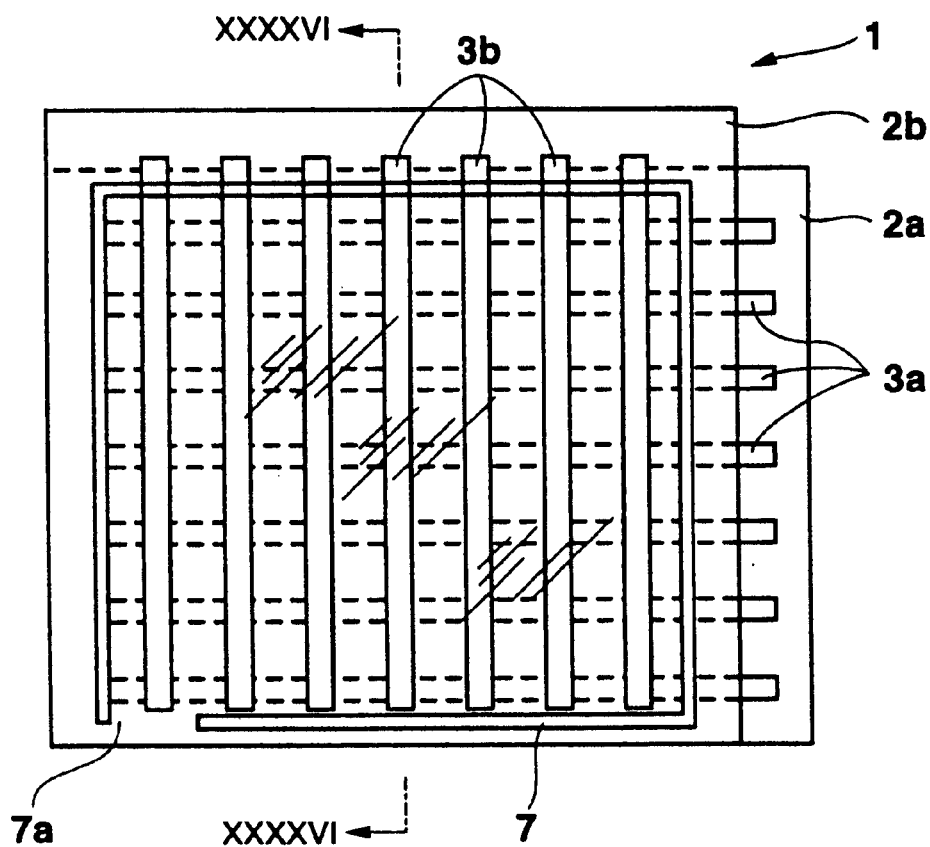
FIG. 1 is a schematic plan view showing a liquid crystal display device in the related art.
Figure 2:
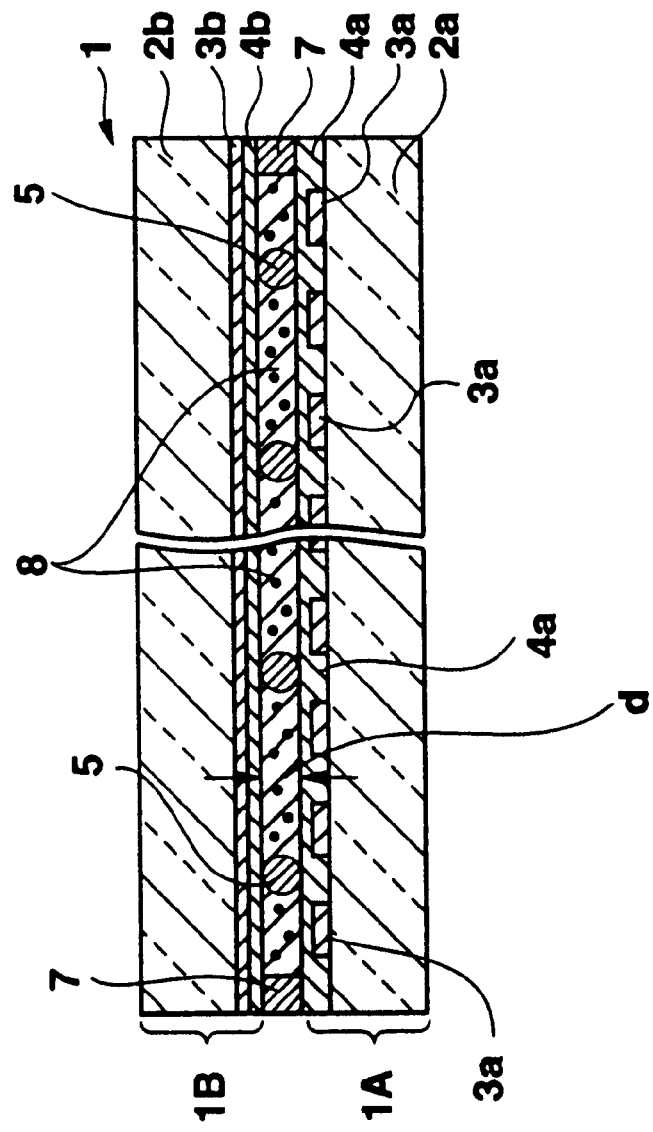
FIG. 2 is a schematic cross-sectional view (cross sectional view taken on line XXXXVI—XXXXVI of FIG. 1.
Figure 3:
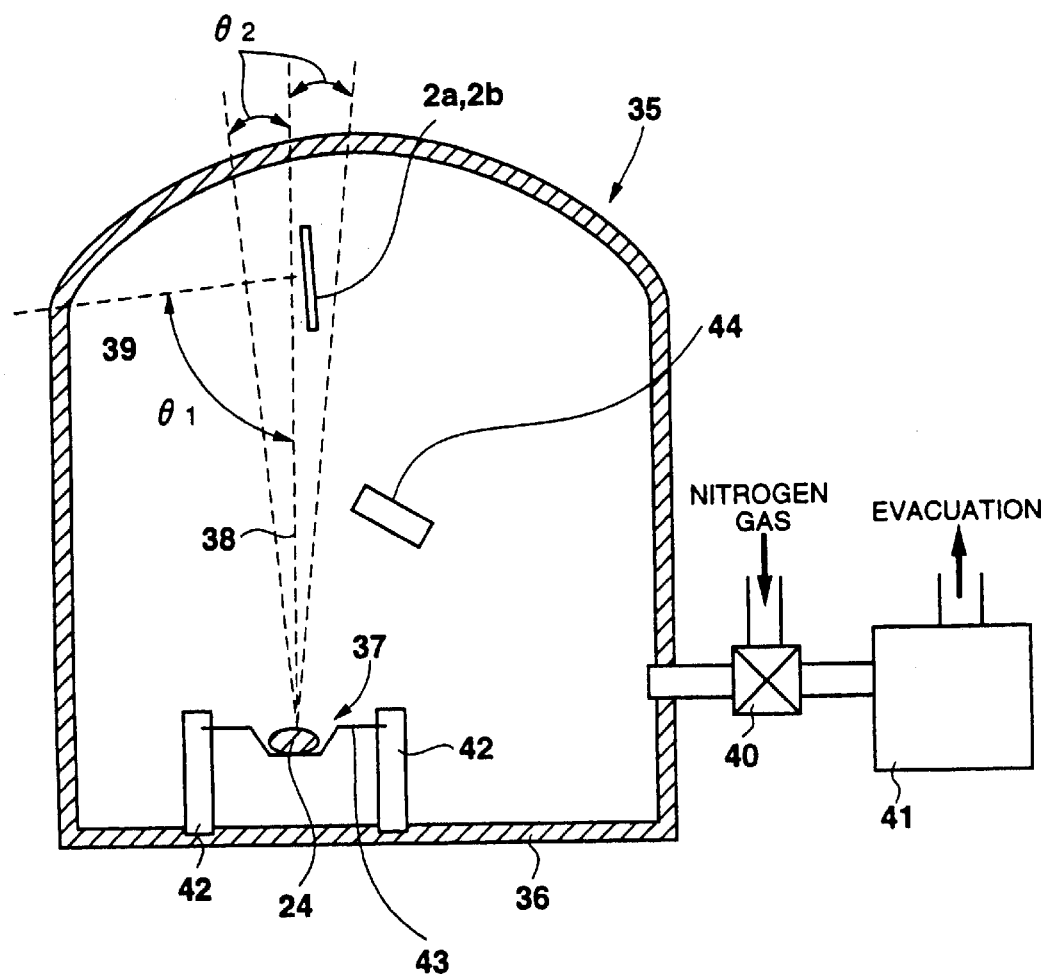
FIG. 3 is a schematic view showing a method for forming the orientation film of the liquid crystal display device by vacuum deposition.
Figure 4:
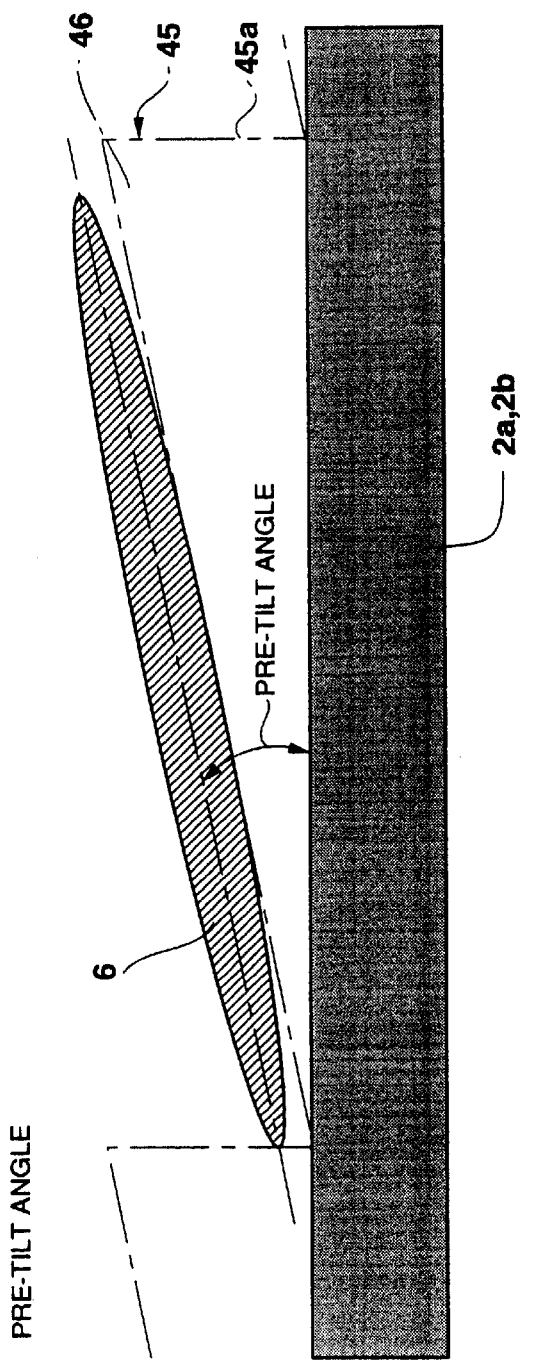
FIG. 4 is a schematic diagram showing the pre-tilt angle of the liquid crystal molecules on the orientation film.
Figure 5:
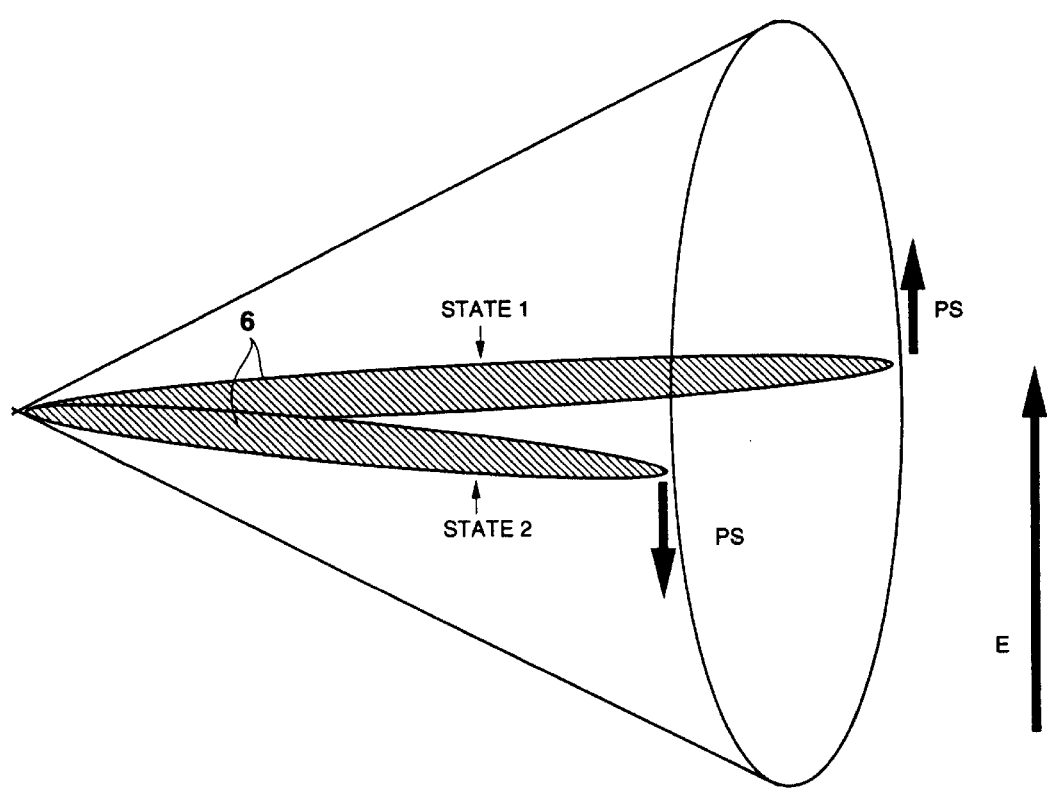
FIG. 5 is a diagram showing a model of ferroelectric liquid crystal.
Figure 6:
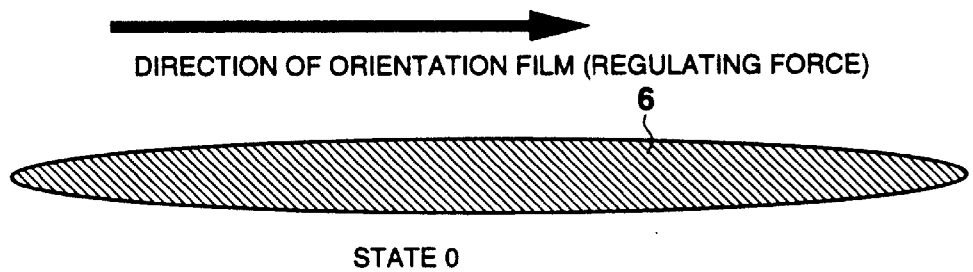
FIG. 6 is a schematic diagram showing the orientation direction of the liquid crystal molecules.

In the liquid crystal device of the present invention, when the radius of curvature of the recess portions of the grooves is excessively large, the liquid crystal molecules are liable to be oriented along the steps of the projections, and thus the radius of curvature of the recess portions is preferably set to 0.3 μm or less.

Further, it is required to orient the liquid crystal molecules at a desired pre-tilt angle in one direction on the projections. In order to satisfy this requirement, a/b is preferably set to be larger than 1 where a represents the distance between the start point position and the peak position of the projections in the direction parallel to the grooves and b represents the distance between the peak position and the end point position of the projections in the direction parallel to the grooves.

The inner surfaces coming into contact with the liquid crystal may be the inner surfaces of the liquid crystal orientation control layers. However, the plural grooves and the projections having an asymmetric shape such as a sawtooth shape may be formed on the inner surfaces by processing layers which are in contact with the liquid crystal. Or, the plural grooves and the projections on the inner surfaces may be formed by following the surface shape of the substrates corresponding thereto.

In the liquid crystal device of the present invention, in order to further promote the effect as described above, the depth and pitch of the grooves and the projections are preferably set to specific ranges respectively. That is, when representing the depth of the grooves by $D_1$; the height of the projections by $D_2$; the pitch of the grooves by $A_1$; and the pitch of the projections by $A_2$, $R_B$ which is defined by $R_E=(D_1^2/A_1^3)/(D_2^2/A_2^3)$ is set to 4.4 or more.

Furthermore, a condition required for the materials has been considered to orient the liquid crystal with the grooves and the projections such as the sawtoothed structure or the like, and as a result, the present inventors have found out that the contact angle to the liquid crystal affects the orientation characteristic, the switching characteristic and the temperature characteristic. From this viewpoint, the contact angle between the liquid crystal and the inner surfaces contacted with the liquid crystal is preferably set to 17 degrees or less.

In this case, the inner surfaces which are in contact with the liquid crystal are subjected to an ultraviolet-ray radiation, or a coupling treatment, whereby the contact angle as described above can be controlled.

It is preferable for gradation display to provide two or more kinds of sawtoothed tilt angles (or pre-tilt angles). To form two or more areas whose sawtooth structure are in the anti-parallel configuration improved the viewing angle.

In order to reduce the loss of intensity of electric field, an electrode may be formed on the surface of the liquid crystal orientation control layer.

The liquid crystal device of the present invention enables the driving of the ferroelectric liquid crystal by the simply matrix system, which has been difficult or impossible with the conventional device. This means that by a combination of the above grooves and projections, the switching of the liquid crystal molecules can be easily performed by even a low voltage pulse driving operation.

In the liquid crystal device of the present invention, the pillar-shaped or wall-shaped holding means for keeping the gap between the pair of substrates is provided between the electrodes. For example, the pillar-shaped or wall-shaped holding means may be provided to one of the inner surfaces contacted with the liquid crystal or one of the substrates while it is fixed to the other inner surface or substrate.

Further, if separation walls are provided on the inner surface of the substrate to separate the respective neighboring picture elements from each other, the operation of liquid crystal in a picture element can be prevented from being effected by that of a picture element adjacent thereto.

In the manufacturing method of the present invention, the sectional shape, pitch, width and depth of the grooves and the projections are preferably controlled by controlling the modulation pattern of laser beams by AOM or the like, the γ-characteristic of the photoresist, the wavelength of the laser beams and the focus of the laser beams.

Further, the grooves and the projections can be formed on the inner surfaces coming into contact with the liquid crystal (particularly, the surfaces of the liquid crystal orientation control layers) by copying the surface shape of a master which is cut to have the shape corresponding to desired grooves and projections.

EXAMPLES

Examples of the present invention will be described hereunder in more detail.

Construction of Liquid Crystal Display Device and its Characteristics

Figure 7:
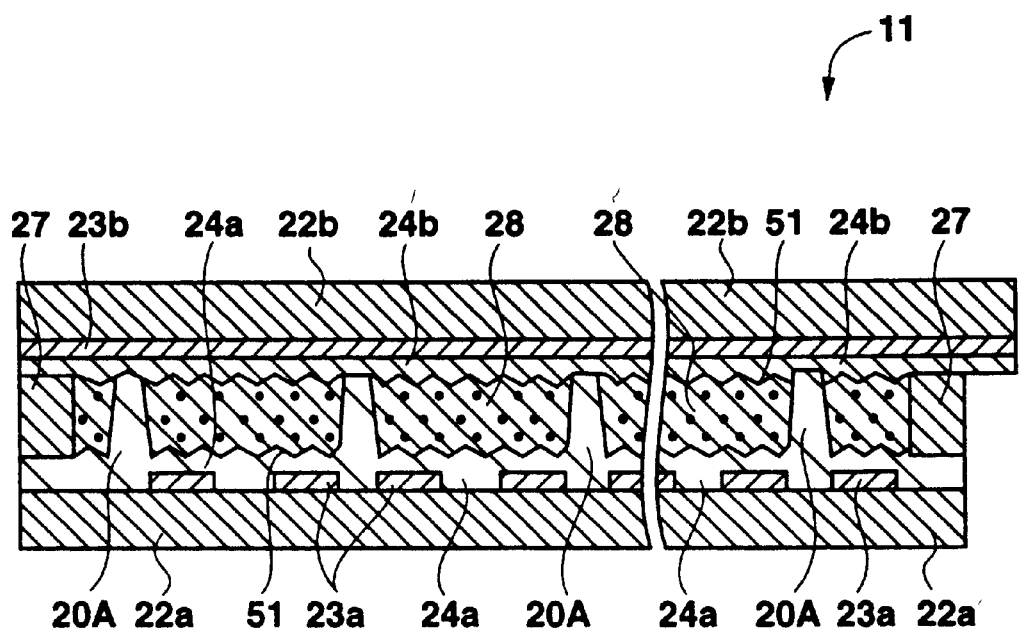
FIG. 7 is a cross-sectional view showing a liquid crystal display device according to the present invention.

FIG. 7 shows an Example of a ferroelectric liquid crystal display device (FLC display) 11 according to the present invention.

According to the FLC display 11, like the transparent electrode layers 3a shown in FIG. 1, many transparent electrode layers 23a of ITO (indium tin oxide: conductive oxide of indium doped with tin) or the like are formed in a stripe shape on the inner surface of one transparent substrate 22a of glass or the like, and a liquid crystal orientation film 24a of photocurable resin (2P) is coated on these transparent electrode layers.

Figure 8:
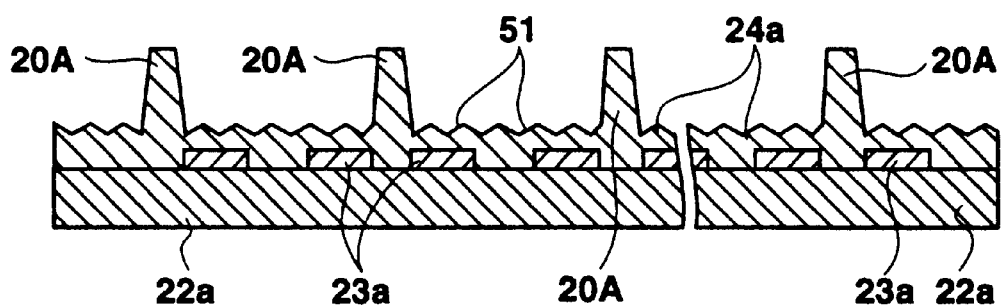
FIG. 8 is a cross-sectional view showing a substrate on the one side of the liquid crystal display device.

On the liquid crystal orientation film 24a there are provided plural grooves 5a and sawtoothed asymmetric projections 51 according to the present invention. FIG. 8 shows the construction of one substrate side before a cell is fabricated.

Further, FIG. 7 shows that a plurality of pillar-shaped or wall-shaped projections 20A having a trapezoidal sectional shape having the same function as the spacers (see FIG. 1) as described above are provided in a parallel stripe pattern extending from one end to the other end of the substrate 22a (in a direction vertical to the drawing surface), and the electrodes 23a as described above are provided substantially in parallel to one another between the projecting portions 20A. Each projecting portion 20A extends from one substrate 22a to the other substrate 22b, and is fixed thereto. One projecting portion 20A is provided every predetermined number of electrodes 22a (for example, ten electrodes 22a, and in order to make the understanding clear, the illustration of FIG. 7 is made simple.

The other substrate 22b is also a transparent substrate of glass or the like, and like the substrate 22a, transparent electrode layers 23b and a photocurable resin (2P) layer 24b serving as a liquid crystal orientation layer like the resin layer 24a are successively laminated on the inner surface of the substrate 22b. The liquid crystal orientation films 24a and 24b are disposed to confront each other.

Both the substrates 22a and 22b are pressed against each other while the ferroelectric liquid crystal 28 is sandwiched therebetween, and the periphery thereof is sealed by an adhesive agent 27 to complete the fabrication of the cell 11.

Figure 9A:
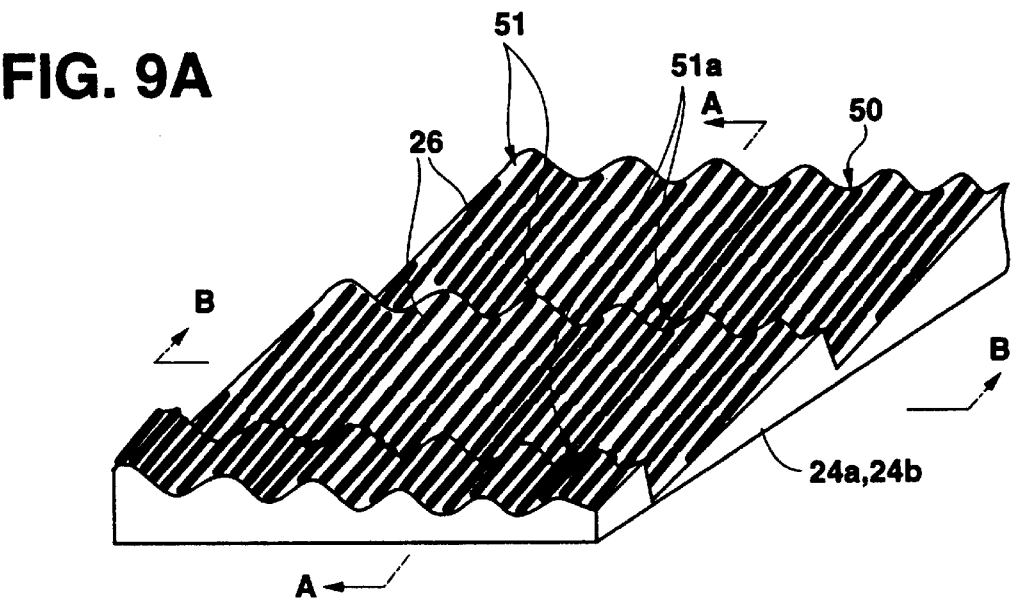
FIG. 9A is a schematic perspective view of the surface of an orientation film of the liquid crystal display device.
Figure 9B:
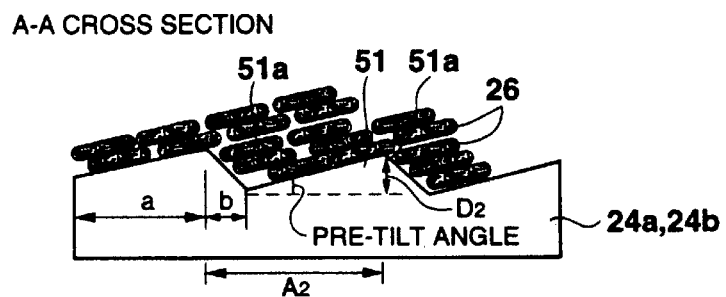
FIG. 9B is a cross-sectional view taken along A—A line of FIG. 9A.
Figure 9C:
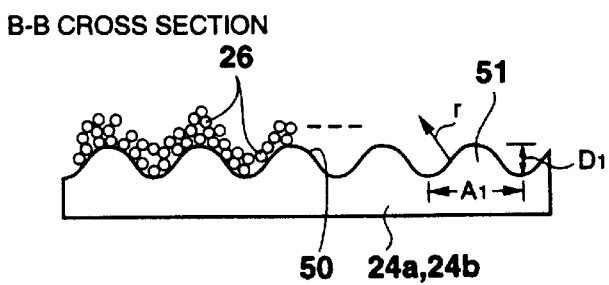
FIG. 9C is a cross-sectional view taken along B—B line of FIG. 9A.

The construction to be noted here is that many parallel grooves 50 and the sawtoothed projections 51 along the respective grooves are formed on the inner surfaces of the liquid crystal orientation films 24a and 24b contacted with the liquid crystal 28 as shown in FIGS. 9A, 9B and 9C, and the minimum radius of curvature of the recess portions of the grooves 50 in the direction perpendicular to the longitudinal direction of the grooves 50 (see FIG. 9C) is set to 0.1 μm or more (preferably, below 0.3 μm).

That is, since the minimum radius of curvature (hereinafter merely referred to as radius of curvature) of the recess portions of the grooves 50 r is above 0.1 μm, as compared with a case where the radius of curvature is smaller than 0.1 μm, an orientation regulating force which is more suitable to obtain the switching characteristic of the ferroelectric liquid crystal molecules 26 occurs, and therefore, the pulse driving of the ferroelectric liquid crystal device by the simply matrix can be performed with a low voltage.

Further, since the orientation regulating force due to the grooves 50 is stronger than the orientation regulating force in the step 51a direction due to the projections 51 of the sawtoothed structure (direction perpendicular to the grooves 50), the liquid crystal molecules 26 are oriented in the longitudinal direction of the grooves 50. Accordingly, the liquid crystal molecules are oriented along the sawtoothed structure at a fixed pre-tilt angle, whereby defects hardly occur in the picture elements, and thus a display characteristic of high contrast can be obtained. That is, as shown in FIG. 10A, the uniaxial orientation due to the grooves 50 and the pre-tilt angle due to the sawtoothed projections 51 interact with each other additively or synergetically.

In addition, the grooves 50 and the projections 51 are formed by cutting the master with the laser beams modulated by the AOM as described above, and copying the processed master. Therefore, the master block can be processed over a large area by the AOM modulation, and the manufacturing process of the device can be easily performed in a short time and at a low cost.

That is, orientation grooves 50 of the liquid crystal are formed according to the scan direction of the polygon mirror, and the structure to generate the pre-tilt is formed by modulating the intensity of light beam while scanning the beam. The gap between the orientation grooves is determined by a shift amount of the stage during one scan operation of the polygon mirror.

Normally, the liquid molecules 26 are oriented at a pre-tilt angle to the substrates 22a and 22b (actually, the orientation films 24a, 24b), and thus they can be kept in any one of two states (1) and (2) as shown in FIG. 10B when arranged along the orientation grooves. If these two states coexist on the substrate, the boundary therebetween acts as a defect. For example, with respect to ferroelectric liquid crystal, it appears as a hairpin or zigzag defect. In this embodiment, formation of an uniform orientation state (book shelf structure) as shown in FIG. 10C is facilitated by forming the projections 51 having the asymmetric structure and disposing the two substrates so that the asymmetric structures of the two substrates are confronted to each other when a cell is fabricated (in this case, the shape of the projections 51 is slightly different from the shape of those of FIGS. 9A, 9B and 9C).

As described above, the liquid crystal device according to the present invention has the excellent orientation characteristic (particularly, the same as or more than that of the SiO oblique deposition film). In addition, an orientation film which has higher productivity than the rubbing film, and the pre-tilt angle of the liquid crystal can be controlled suitably to achieve a high contrast.

With respect to such a remarkable effect, assuming that the distance between the start point position and the peak position of the projections 51 in the direction parallel to the grooves 50 be a and the distance between the peak position and the end start position of the projections 51 be b in FIG. 9B, it is desirable that larger than 1 (that is, the projection is asymmetric in the longitudinal direction of the grooves 50) in order to orient the liquid crystal molecules at a pre-tilt angle in one direction on the projections 51.

If a/b is not larger than 1, the liquid crystal molecules are hardly oriented in one direction on the slant surface of a (if a/b=1, the liquid crystal molecules are oriented on both the slant surfaces of a and b, and orientation defects occur). No problem occurs even if a/b is larger than 1. It is more preferable that a/b is set to 1.6 to 2.

In order to further enhance the above-described effect, with respect to the depth and pitch of each of the grooves 50 and the projections 51, assuming that the depth of the grooves 50 be $D_1$; the height of the projections 51 be $D_2$; the pitch of the grooves 50 be $A_1$; and the pitch of the projections 51 be $A_2$, it is desirable that $R_B$ which is defined by $R_E = (D_1^2/A_1^3)/(D_2^2/A_2^3)$ be set to 4.4 or more.

If $R_B$ is set to 4.4 or more as described above, the orientation along the grooves 50 dominates more remarkably, and the desired pre-tilt angle can be obtained.

Further, when the liquid crystal molecules 26 is oriented by the grooves 50 and the projections 51 having the sawtoothed structure, the contact angle between the surface of the orientation film 24a ( 24b) contacted with the liquid crystal 26 and the liquid crystal 26 is preferably set to 17 degrees or less because the contact angle between the orientation film and the liquid crystal affects the orientation characteristic, the switching characteristic and the temperature characteristic.

The material of the orientation film as described above can control the orientation direction of the liquid crystal by the surface shape thereof because the contact angle to the liquid crystal is sufficiently small and the liquid crystal molecules are excellently oriented. By the same reason, no vertical orientation occurs, and an excellent memory property is showed. Further, the contact angle of the liquid crystal to the substrate is dependent on the temperature, however, the temperature-dependency of the contact angle can be suppressed by using a material having a small contact angle for the substrate surface. That is, the pre-tilt angle caused by the sawtoothed structure can be kept fixed irrespective of the temperature.

Any material may be used as the substrate 22a (22b) used in the liquid crystal device according to the present invention insofar as it is normally usable for the liquid crystal display device. The basically required characteristic is the smallness of birefringence and glass, methacrylic resin, norbornene resin, polyolefin resin or the like may be used. Polycarbonate resin which is excellent in water absorption and heat resistance is also usable because the birefringence thereof can be suppressed by improving a shaping method therefor.

Any material may be used as the transparent electrodes 23a and 23b insofar as it is normally usable for the liquid crystal device, and ITO (Indium Tin oxide: conductive oxide of indium doped with tin) or the like may be used.

The material of the surface contacted with the liquid crystal 28, particularly the orientation film material is required to have such a characteristic that the contact angle to the liquid crystal is small, and thus (1) a material having a small contact angle is used or (2) a method for reducing the contact angle by surface-reformation is used.

When the orientation film is in contact with the liquid crystal, the material having, for example, contact angle of 17 degrees or less, such as, ultraviolet-ray curable resin: OVD-005 (produced by Nippon Chemiphar Co., Ltd.) having a contact angle of 5.5 degrees to the liquid crystal, ultraviolet-ray curable resin: Die Cure Clear SD-17 (produced by Dainippon Ink & Chemicals, Inc.) which is subjected to surface-reformation under a low-pressure mercury lamp, or the like may be used. When an insulating film is required, polyvinyl alcohol is used.

With respect to the material contacted with the liquid crystal, it is necessary to conduct a sufficient curing reaction or a water-washing treatment on the material so that incurable monomers, reaction starting agent, etc. in the material if the material is a curable type resin, or plasticizer, etc. in the material if the material is a plastic material, can be prevented from eluting into the liquid crystal while it is kept for a long time, thereby sufficiently removing these low molecular impurities. If these impurities are eluted into the liquid crystal, there arise problems such as variation of the driving characteristics, deterioration of the liquid crystal, etc.

Any liquid crystal material may be basically used insofar as it has a ferroelectric property. Those materials produced by Chisso Corporation, Merk Co., Ltd. BDH Co., Ltd., or other well-known ferroelectric liquid crystal compounds or a composition of the ferroelectric liquid crystal and non-chiral liquid crystal may be used. However, no restriction is imposed on the liquid crystal material, and no restriction is imposed on its phase series. It is necessary only that the liquid crystal material be in a chiral smectic liquid crystal phase in an available temperature range. That is, CS-1014 (produced by Chisso Corporation) listed in an example as described later, and other materials may be used. Further, analog gradation can be achieved by using materials which are proposed in Japanese Patent Application No. Hei-4-309238 or the like by the present applicant.

The liquid crystal is filled into a cell gap by an injection method as described later, and besides this method, a liquid crystal display device can be produced by coating the liquid crystal as proposed in the Japanese Patent Application No. Hei-6-270272 by the present applicant. By this coating method, the cost for the production of the liquid crystal display device can be greatly reduced, and also a liquid crystal display device of large size, high uniformity and high performance can be provided.

With respect to the process of manufacturing the liquid crystal device according to this example, a method of scanning laser beams which are modulated by the AOM as described above is more suitable to form the surface shape of the orientation film 24a (24b).

In order to manufacture the device through a cutting process according to the laser scan system as described above, the steps shown in FIG. 11 to FIG. 18 are successively performed, and the flow f these steps is summarized as follows.

Figure 11:
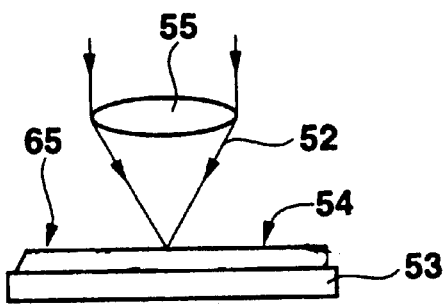
FIG. 11 is a cross-sectional view showing a step of a manufacturing process of the liquid crystal device.

(1) Exposure on a work 65 comprising a glass substrate 53 coated with a photoresist 54 by a laser lithography (focusing a modulated laser beam 52 through a lens system 55) (FIG. 11).

Figure 12:
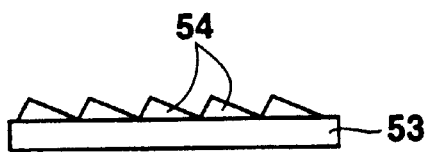
FIG. 12 is a cross-sectional view showing another step of the manufacturing process.

(2) Development (FIG. 12).

Figure 13:
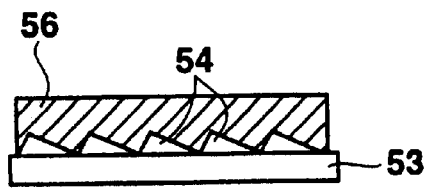
FIG. 13 is a cross-sectional view showing another step of the manufacturing process.

(3) Plating 56 (FIG. 13).

Figure 14:
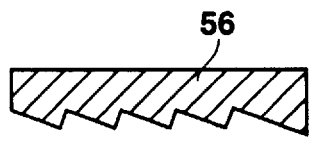
FIG. 14 is a cross-sectional view showing another step of the manufacturing process.

(4) Exfoliation of the resist 54 and the plating 56 from each other (the exfoliated plating 56 is called a stamper) (FIG. 14).

Figure 15:
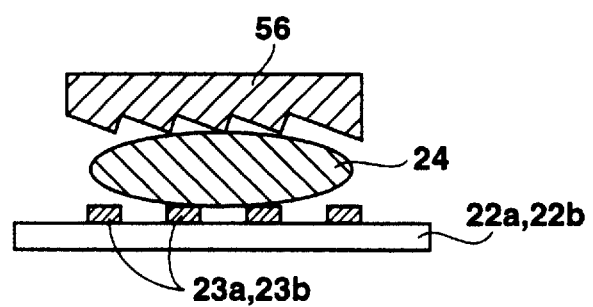
FIG. 15 is a cross-sectional view sowing another step of the manufacturing process.

(5) UV (ultraviolet-ray) curable resin 24 (2P) is dropped onto the stamper 56, and a glassy 22a (or 22b) on which an electrode 23a (or 23b) is patterned is mounted on the stamper 56 (FIG. 15). The stamper 56 is provide with recess portions corresponding to the projecting portions 20A shown in FIG. 8, however, the illustration of the recess portions is omitted in FIG. 15.

Figure 16:
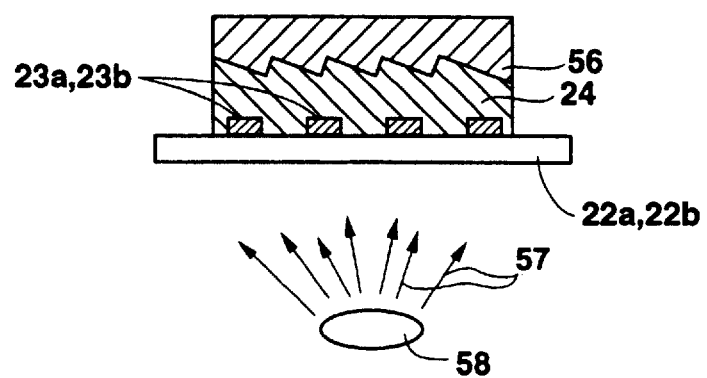
FIG. 16 is a cross-sectional view showing another step of the manufacturing process.
Figure 17:
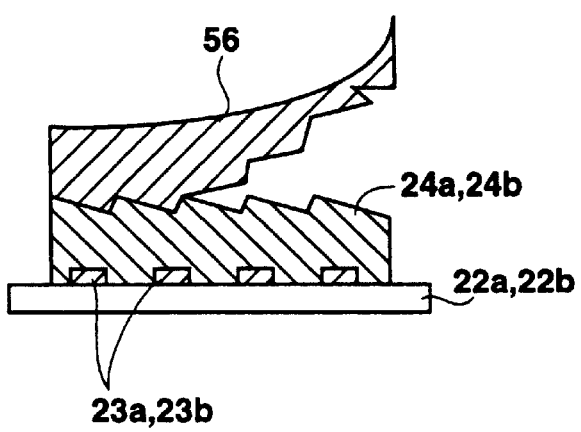
FIG. 17 is a cross-sectional view showing another step of the manufacturing process.
Figure 18:
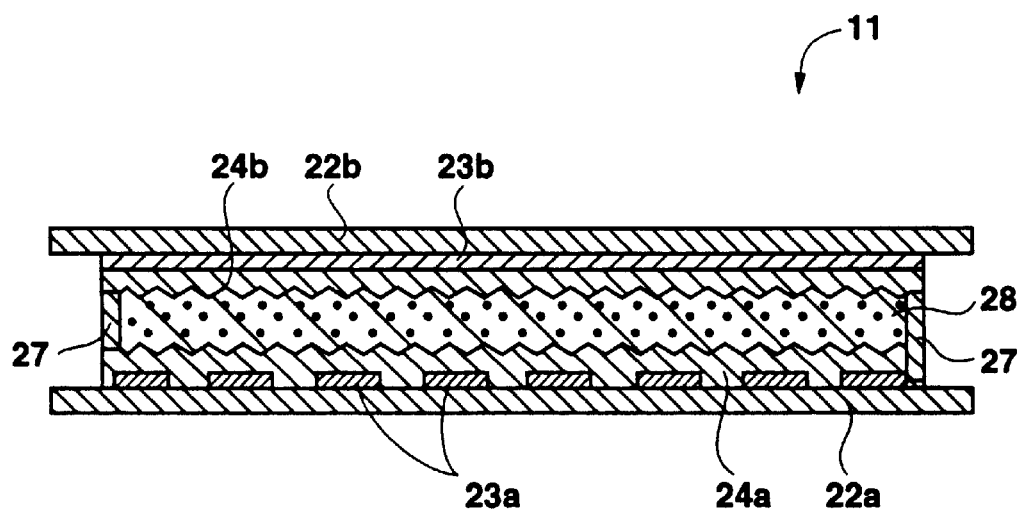
FIG. 18 is a cross-sectional view showing another step of the manufacturing process.

(6) UV 57 is radiated from a lamp 58, and the stamper 56 is exfoliated after the UV curable resin is cured (FIGS. 16, 17).

(7) Liquid crystal 28 is filled and sealed between the substrates 22a and 22b as described above to fabricate a cell (FIG. 18). The cell is schematically illustrated, and it may have the construction which is shown in detail in FIG. 7.

Figure 19:
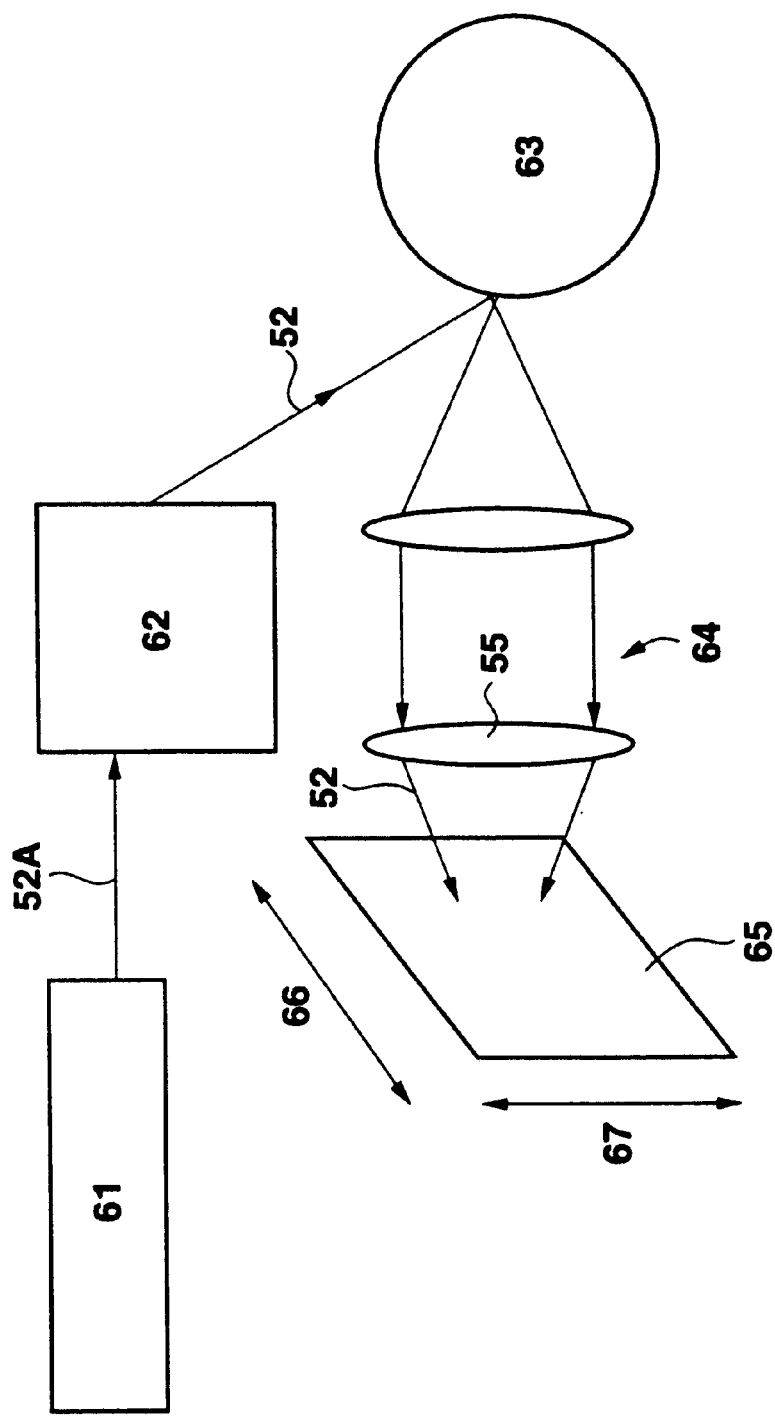
FIG. 19 is a schematic diagram showing a laser lithography in the manufacturing process of the liquid crystal display device.

In this manufacturing method, it is very important to use the laser lithography technique as described above. That is, the photoresist 54 on the substrate 53 is cut to have the uneven shape corresponding to the grooves 50 and the projections 51 by the modulated laser beam 52 by the laser lithography technique. The laser lithography is a technique of modulating the intensity of the laser beam 52 by a modulator, focusing the laser beam by a lens system 55 and two-dimensionally scanning the laser beam on the surface to perform exposure. FIG. 19 shows a main construction of an apparatus (lithography apparatus) for performing the laser lithography.

Figure 20:
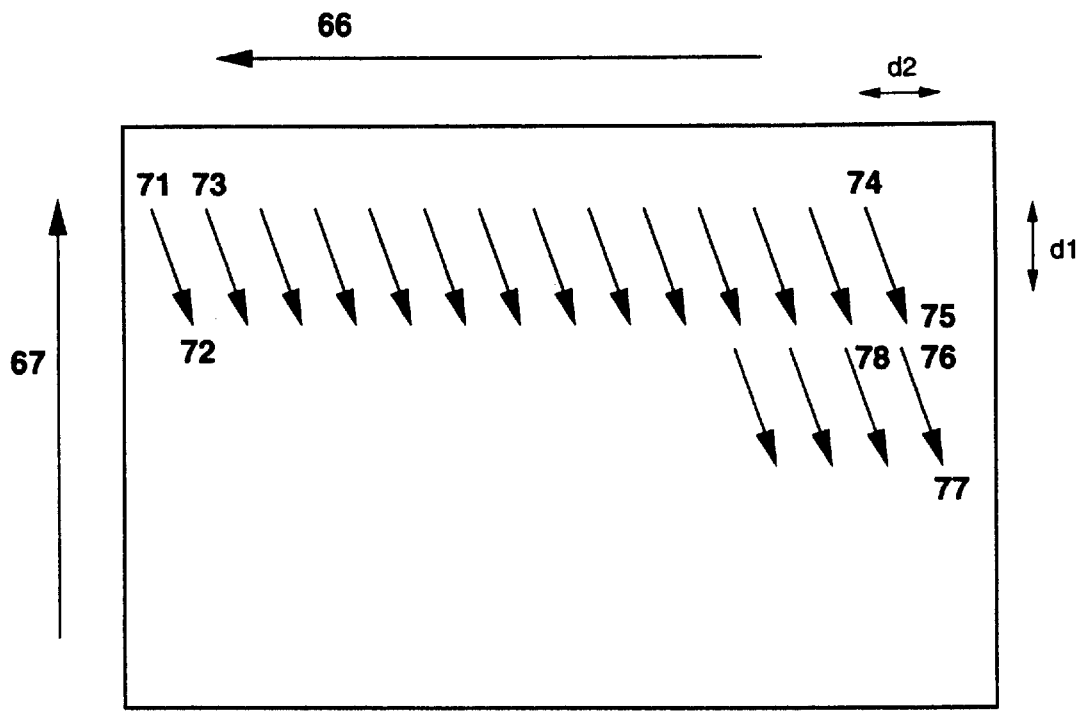
FIG. 20 is a schematic plan view showing a cutting status by the laser lithography.

The laser beam 52A emitted from the laser 61 is subjected to the intensity modulation by the optical modulator 62. At this time, a modulation signal which is matched with the exposure pattern corresponding to the grooves 50 and the projections 51 is input. The laser beam 52 thus modulated is deflected by a polygon mirror 63, and then projected onto the work 65 having the photoresist 54 by a reducing projecting optical system 64. As a result, the exposure is linearly performed at a length of $d_1$ as shown in FIG. 20. At the same time, the work 65 is moved in a direction 66 by using a linear stage.

As a result, the pattern is exposed onto the work 65 in a state shown in FIG. 20. When the exposure in the direction 66 is completed by one line, the linear state is moved by a distance $D_1$ in the direction 67, and the exposure for a next line is performed, whereby the exposure is performed on the entire work 65. That is, the beam starting from a point 71 is moved in accordance with the rotation of the polygon mirror 63 and the movement of the stage in the direction 66, and reaches a point 72 at the time when it reaches the end of one surface of the polygon mirror 63. Thereafter, the beam is shifted to a next surface of the polygon mirror 63, and moved to a point 73.

When this operation is repeated and the stage is shifted in the direction 67 by the distance $d_1$ after the beam reaches a point 75 from a point 74, the beam is shifted to a point 76. Thereafter, by moving the stage in the direction opposite to the direction 66, the exposure point is shifted to points 77, 78. By repeating this operation, the exposure is performed on the whole surface of the work.

The pattern which is suitable for the orientation of the liquid crystal is exposed by using the laser lithography apparatus. For this purpose, a suitable input signal may be input to the optical modulator 62. In this example, a sawtoothed waveform signal is input. In this case, by changing the pattern of the modulation of the AOM, the γ-characteristic of the used photoresist, the wavelength of the laser beam, the focus of the laser, etc., the shape corresponding to the grooves and the sawtoothed section can be formed at the same time, and the pitch and the angle of the sawtoothed structure and the width, the depth and the sectional shape (the radius of curvature of the projections and the recess portions of the grooves) of the grooves can be controlled.

By copying the surface shape of a die member thus obtained, a desired surface shape can be formed on the orientation film 24a (24b). The shape formed by the laser scan can be directly used but it is more productive to form copies by using a die (see FIG. 12) which is obtained by a development treatment after the laser scan operation. In accordance with the copying frequency, the same pattern as the original uneven pattern (a copy of a copy has an original pattern), or an inverted pattern can be obtained.

With respect to a method for the copy, any method may be applied insofar as it can surely copy the pattern. FIGS. 21 to 25B show various die members or copying methods.

Figure 21:
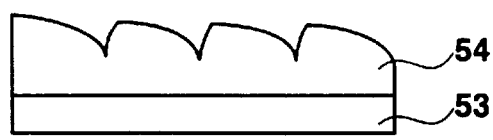
FIG. 21 is a cross-sectional view showing a die member obtained in the manufacturing process.
Figure 22:
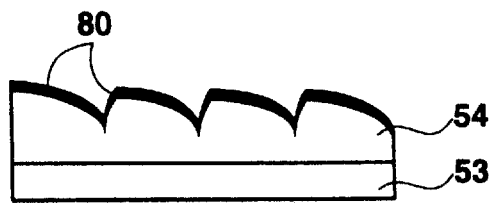
FIG. 22 is a cross-sectional view showing another example of the die member.

FIG. 21 shows an actual example of the master block corresponding to FIG. 12, and various die members can be formed by using this master block. As a method of manufacturing the die member, (1) a metal film 80 is formed to a small thickness on a resist 54 to form a die member (FIG. 22).

This metal film is formed for providing better removability in copying and may be very thin (e.g., 1 μm or less). Any metal such as Ni, Cr or Cu can be used if it has a good removability from a copy material. The film may be an alloy and besides this, it may be an inorganic material such as a metal oxide film or a metal nitride film. They are formed by sputtering, deposition or plating.

Figure 23A:
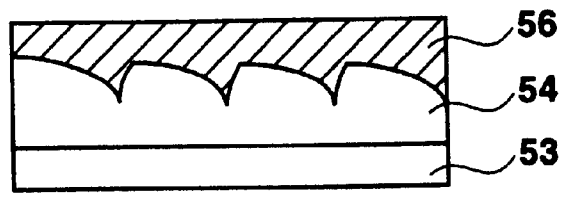
FIGS. 23A and 23B are cross-sectional views showing a manufacturing method for another example of the die member.
Figure 23B:

(2) A metal plating is performed on a resist substrate to form a metal plate 56 as a die member (FIGS. 23A, 23B). To remove a metal plate 56 from the resist 54, a resist 54 is dissolved in an organic solvent.

Figure 24A:
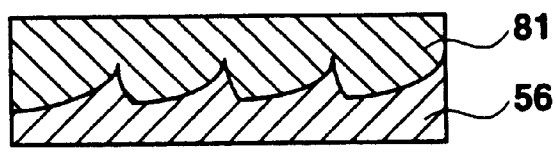
FIGS. 24A and 24B are cross-sectional views showing a manufacturing method for another example of the die member.
Figure 24B:
Figure 25A:
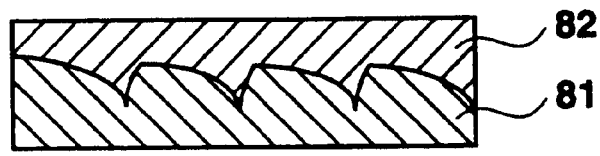
FIGS. 25A and 25B are cross-sectional views showing a manufacturing method for another example of the die member.
Figure 25B:
Figure 26A:
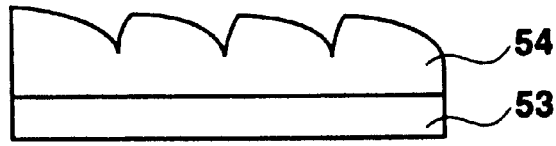
FIGS. 26A to 26D are cross-sectional views showing a manufacturing method for another example of the die member.
Figure 26B:
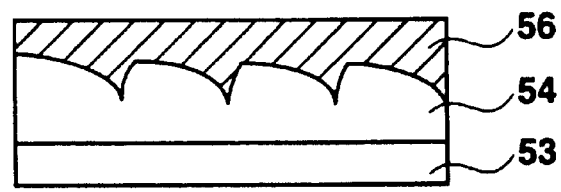
Figure 26C:
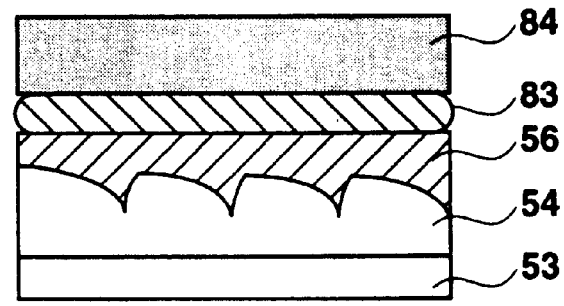
Figure 26D:
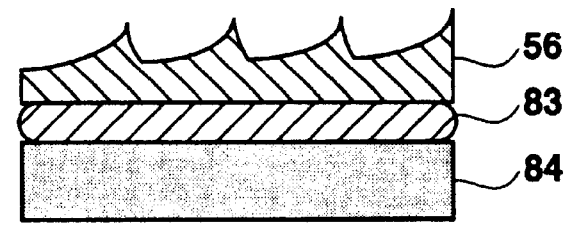

(3) the die member obtained by the method (2) is coated with remover and plated to obtain a metal plate 81 as a die member (at this time, the metal plate 81 is a die member in which the shape of the metal plate 56 is inverted) (FIGS. 24A, 24B), or (4) the metal plating is further performed on the metal plate 81 to obtain a metal plate 82 as a die member (FIGS. 25A, 25B).

The die members 56 and 82 have the same uneven shape but in the process (3) or (4), many die members may be copied from one die member, so that many die members can be obtained by performing the laser lithographic operation once.

Further, according to the methods (1) and (3), the uneven shape copied onto the liquid crystal orientation substrate is inverted to the resist pattern. Accordingly, integration with other structures such as pillar (projection) and domain (picture element) separating walls as described later, etc. can be achieved.

FIGS. 26A to 26D show an example in which the stamper 56 is formed through the plating by using the master shown in FIG. 21 fixed to the substrate 84 by the adhesive agent 83, unified and then exfoliated as a die member.

When a cell of liquid crystal is formed, the gap between the substrates is required to be uniform and thus the die member must be designed to have high flatness. On the other hand, a die member formed by the plating is liable to have a concave or convex surface when exfoliated from the resist by an internal stress. This shape is dependent on the plating process. For example, in the case of sulfamic acid bath, the shape may be a concave shape at a plating thickness of 300 $\mu$m or less and a convex shape at a plating thickness of 400 $\mu$m or more. In order to secure flatness, the plating thickness is set to 300 to 400 $\mu$m, however, the method shown in FIGS. 26A to 26D is effective to further enhance the flatness.

First, the metal die member 56 is formed on the resist master 54 by the plating method. Subsequently, the back surface of the metal die member is polished to remove large projections and fluctuation. Thereafter, a support substrate 84 is attached to the back surface with the adhesive agent 83. After the result is sufficiently hardened, the resist 54 is solved by solvent, and exfoliated to obtain the die member.

Any material such as glass, metal, semiconductor or the like may be used for the support substrate 84 insofar as it has high flatness and it is not bent by the stress of the die member. As the adhesive agent 83 may be used UV-curable resin, epoxy resin, soldering material or the like.

Each die member as described above is formed on the basis of the uneven resist pattern 54 formed by the laser lithography as described above, and then copied onto the orientation substrate. In the copy process, UV curable resin is dropped as a copy member onto the substrate on which the ITO electrode pattern is formed or onto the die member, the die member and the substrate are pressed against each other, the resin is cured by UV light, and then the die member is exfoliated. By the 2P method as described above, dust which generates in the rubbing process can be prevented, the device can be designed to have a large area, and at low cost and mass production can be achieved.

Figure 27A:
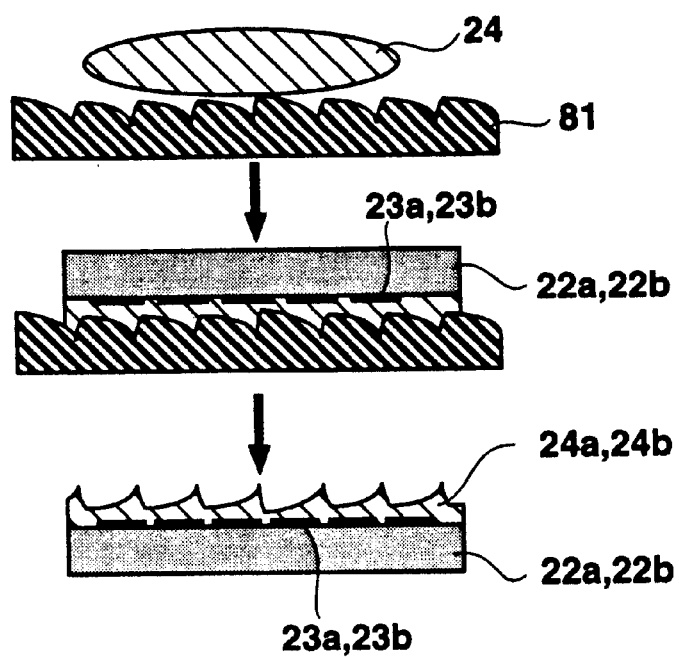
FIG. 27A is a cross-sectional view showing manufacturing steps in another manufacturing process of the liquid crystal display device.
Figure 27B:
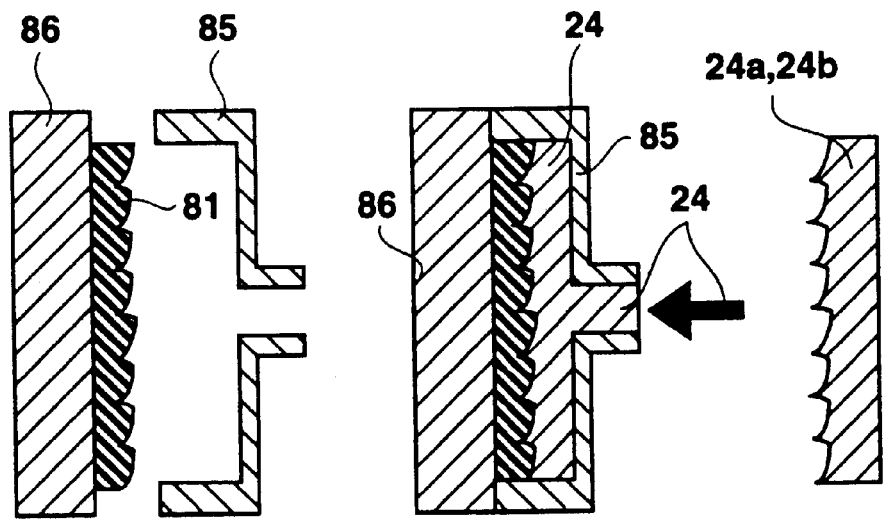
FIG. 27B is a cross-sectional view showing the formation of the orientation film by an injection molding method.

A copy method from the die member to the liquid crystal substrate will be described with reference to FIGS. 27A and 27B. As shown in FIGS. 27A, UV curable resin 24 is dropped onto the die member 81, and a glass substrate 22a, 22b on which a scanning electrode pattern 23a, 23b is formed is pressed against the dropped VU curable resin 24.

UV light is irradiated from the liquid crystal substrate side to cure the UV curable resin 24, and the cured resin 24 is exfoliated from the die member to obtain an uneven pattern on the liquid crystal orientation film 24a, 24b on the substrate.

The plating may be any one of a wet type and a dry type. Ni, Cr, Cu or Ag metal is used as the die member in the case of the plating. Further, photocurable resin, thermosetting resin such as polyimide, urea, melamine, phenol, epoxy, unsaturated polyester, alkyd, or urethan resin, or thermoplastic resin such as polycarbonate or the like may be used as the die member by copying these materials from a metal-plated plate. When the exfoliation from a copy substrate or copy member is poor, a thin metal film is provided by deposition, sputtering, plating or the like to improve the surface property.

As the copy substrate, there may be given acrylic, epoxy resin such as polymethyl methacrylate or the like, and thermoplastic substrate such as polycarbonate or the like. As the copy member, there may be used photocurable resin, the thermosetting resin and the thermoplastic resin as described above.

Further, since the shape reversed to the shape formed by the cutting process can be obtained, these materials, are effective in integrating the projecting portions 20A (pillars), etc. That is, the orientation films 24a and 24b can be formed, and at the same time the structure 20A such as a pillar or a bank can be introduced in place of the conventional spacer. Therefore, a process of scattering the spacers can be omitted, and the cost can be reduced. At the same time, a more accurate gap can be obtained.

According to the method as described above, the substrate and the liquid crystal alignment layer can be integrally formed by using an injection molding method. That is, in order to form these members of thermoplastic resin represented by polycarbonate, as shown in FIG. 27B, a metal die 85 having the liquid crystal substrate 22a, 22b (not shown) is joined to a metal die 91 in which an orientation die member 86 is set, and these joined dies are pre-heated. In this state, the joined dies are heated to a high temperature, then melt resin 24 is injected into the cavity of these dies under pressure, and then the metal dies are cooled to obtain the liquid crystal orientation substrate.

With respect to the thermosetting resin such as polyimide, urea, melamine, phenol, epoxy, unsaturated polyester, alkyd, urethan resin or the like, the injection is performed in a cool state, and then heating is performed to cure the thermosetting resin, thereby obtaining the liquid crystal orientation substrate. A metal die member is preferably used because it needs heat resistance above 200° C. or more.

With respect to the liquid crystal orientation substrate as described above, when wettability between the surface and the liquid crystal is required to be enhanced, thermosetting resin such as PVA (polyvinyl alcohol), polyimide or the like may be coated thinly, and then cured by heating.

Figure 28A:
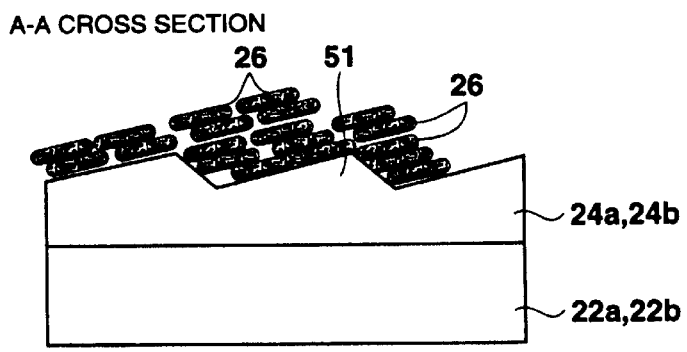
FIGS. 28A and 28B are cross-sectional views showing a substrate together with the surface shape of an orientation film of the liquid crystal display device.
Figure 28B:
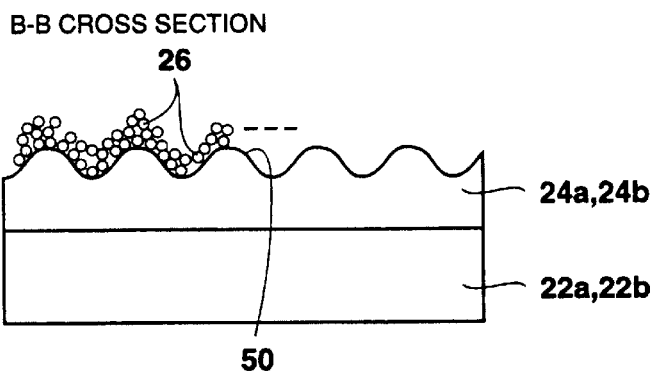

When the laser lithography as described above is used and the orientation film is formed by the 2P method, the grooves 50 and the projections 51 can be formed on the orientation film 24a or 24b on the substrate 22a or 22b (however, the ITO electrode, etc. are not illustrated) as shown in FIGS. 28A and 28B. In place of use of the ultraviolet-ray curable resin like the case of the 2P method, a thermosetting resin may be cured by heating to form an orientation film (thermosetting method).

In place of the 2P method, an injection molding method which is used to produce optical discs, for example, may also be applied. The injection molding method is a method in which thermosetting polymer is poured into a heated mold, pressed and then cooled to copy the mold. This method is basically to produce a substrate itself, and the substrate has an orientation capability. As the construction of the liquid crystal device of this case, the substrates 22a and 22b in FIG. 7 are formed of plastic substrates, the substrates are integrally molded with the projecting portions 20A, and the grooves 50 and the projections 51 as described above are formed on the substrates themselves.

Figure 29A:
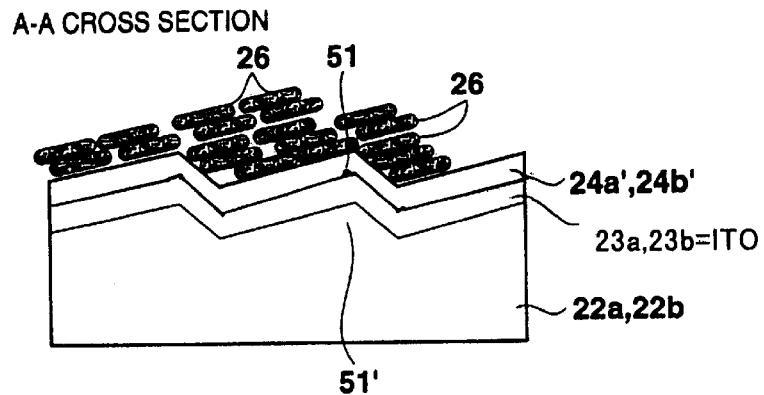
FIGS. 29A and 29B are cross-sectional views showing a substrate together with the surface shape of an orientation film of another liquid crystal display device according to the present invention.
Figure 29B:
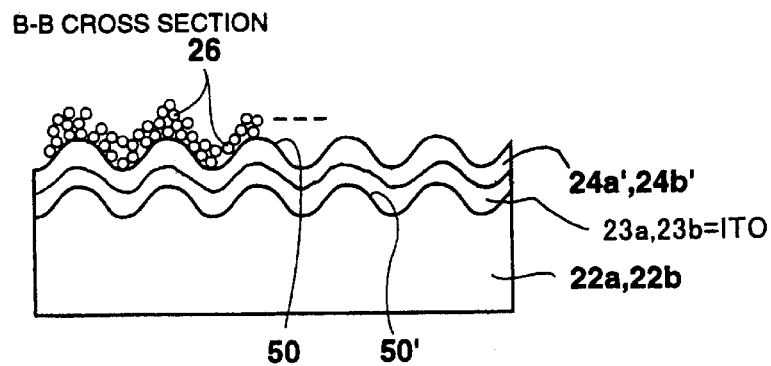

When the above structure is schematically shown in FIGS. 29A and 29B (the ITO electrodes, etc. are not illustrated), grooves 50' and projections 51' which correspond in shape to the grooves 50 and the projections 51 as described above are formed on the surface of the substrate 22a (22b). The surface shape of the substrate can be formed by copying the surface shape of the stamper 56 shown in FIG. 23B to thermoplastic resin. Accordingly, by successively providing ITO and an insulating film on the surface of the substrate, the grooves 50 and the projections 51 which follow the surface shape of the substrate are formed on the surface of the insulating film 24a', 24b'.

The injection molding method requires a relatively high mold manufacturing cost but since it is possible to produce a copy thereof in a shorter time as compared to the 2P method and the thermosetting method after the formation of the mold, this method is suitable for the mass production of the orientation film. Conversely, the mold can be more easily formed by the 2P method and the thermosetting method than by the injection mold method. Therefore, these methods are suitable for producing a variety of kinds of orientation films in small amounts.

The advantages which are obtained by using the laser lithography as described above will be hereunder summarized as follows:

(1) Exposure over large-area is possible.

An exposurable area is determined by the shift amount of the stage, and thus enlargement of the exposing area is facilitated.

(2) Uneven patterns 50, 51 for controlling the orientation can be designed in any form with high precision.

The spot size can be reduced to 0.5 µm or less, so that a fine shape can be formed, and these patterns can be uniformed designed by applying focus servo.

Any form may be obtained by changing a light intensity modulation signal and a stage feeding pitch.

(3) Integration with other shapes is possible.

Pillars for keeping the distance between a pair of substrates fixed and domain separation walls for avoiding interference between picture elements can be formed at the same time.

(4) No dust is generated unlike a rubbing process.

In addition, because of the copy from a replica (a die member), (5) Mass production is possible because copies are obtained from a replica (die member). Therefore, the price is very low, and the cost is further reduced by using the injection molding method.

(6) Both of non-reverse (positive) and reverse (negative) with respect to a resist pattern can be obtained. The degree of freedom for the integration is large.

(7) With respect to maintenance, many die members can be obtained from one resist pattern.

Manufacturing Processes for Liquid Crystal Display Device

Next, a method of manufacturing the liquid crystal display device 11 of FIG. 7 as described above will be described with reference to FIGS. 30 to 35.

1. Outline

All the processes were performed in a clean room until a liquid crystal injection process was completed.

First, many transparent electrode layers 23a of ITO or the like were parallel formed on the surface of a clean glass substrate 22a by the photolithographic method.

Subsequently, a die (stamper) 56 having a shape reverse to the shape which has grooves and the sawtoothed structure on the surface was formed. The stamper was designed to have such a shape (reverse shape to pillars) that the pillar structure corresponding to the conventional spacers is provided on the substrate.

The cleaned glass substrate was sufficiently dried, and subjected to a silane coupling treatment. This treatment was used to enhance film adhesion, and thus it may be replaced by a titan coupling treatment or the like.

Subsequently, ultraviolet-ray curable resin 24 under an uncured state was dropped onto the electrode 23a of the glass substrate 22a or the stamper 56, and the stamper 56 was pressed. Thereafter, ultraviolet rays were irradiated from the glass substrate side to cure the resin, and then the stamper was exfoliated to obtain the surface shape having the orientation capability due to the orientation film 24a.

Subsequently, the glass substrate 22a with the orientation film 24a was cleaned to remove impurities contained in the cured resin (low molecular weight materials such as polymerization initiator, unreacted monomer, dimer, etc.).

Two glass substrates 22a and 22b each having an orientation film thus formed were prepared, partially coated with adhesive agent 27 and then laid one above the other to form a cell.

Further, ferroelectric liquid crystal CS-1014 produced by Chisso Corporation was introduced into the cell.

Next, each of the above-described processes will be described in detail.

(1) Formation of Transparent Electrode

Figure 30:
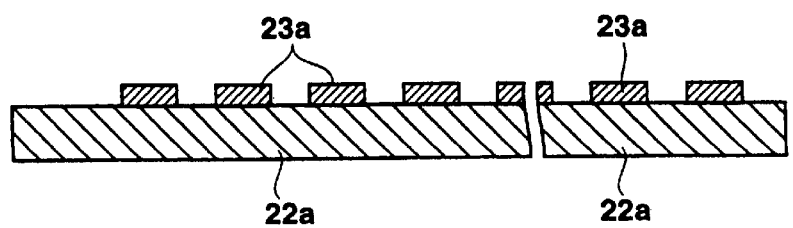
FIG. 30 is a cross-sectional view showing a step of the manufacturing process of the liquid crystal display device according to the present invention.

As shown in FIG. 30, a transparent electrode material layer of ITO was formed on one surface of the glass substrate 22a by a sputtering method, and a transparent electrode 23a of a predetermined pattern was formed by a photolithography method. The general flow of the patterning process will be described below.

(A) Sputtering of ITO (B) Spin coat of resist (C) Pre-bake of resist film (D) Post-bake of resist film (E) Exposure of resist film (F) Etching of resist film (G) Etching of ITO (H) Cleaning (I) Exfoliation of resist film (J) Cleaning (2) Cleaning of Substrate The glass substrate 22a of 6 cm×7 cm was washed and dried in a clean room by a three-tank type ultrasonic cleaner (produced by San Electron Co., Ltd.) as follows.

First tank: an ultrasonic cleaning was conducted on the substrate 22a for 3 minutes at a water temperature of 45° C. by using alkali cleaning (Scat×20) while swinging the substrate 22a.

Second tank: a 3-minute ultrasonic water-washing treatment was conducted on the substrate 22a three times while the substrate 22a was exposed to a pure water shower and swung, and alkali cleaner was poured into the tank.

Third tank: the substrate 22a was immersed in pure water at a water temperature of 80° C. for 1 minute, and then it was gradually lifted up from the pure water by an elevator mechanism, and then left for drying.

Subsequently, an UV ozone cleaning was conducted at a room temperature for ten minutes by using an UV dry stripper cleaner (produced by Samco International Inc.). However, the UV ozone cleaning was not performed after the following orientation film was formed.

(3) Formation of Orientation Film

Figure 31:
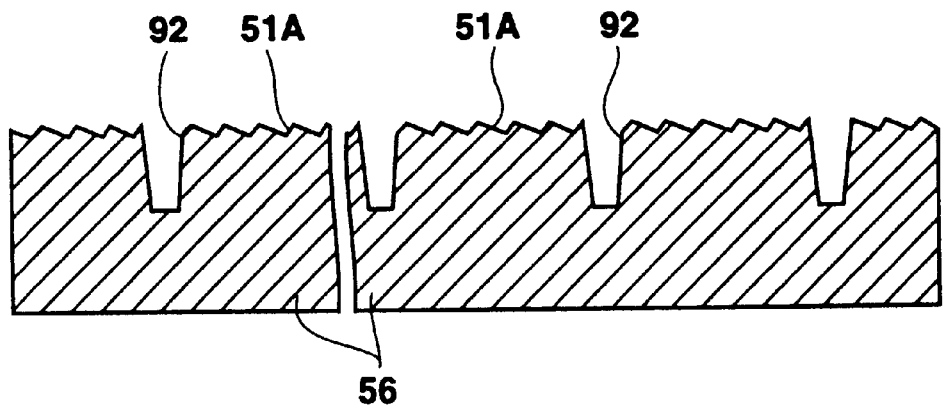
FIG. 31 is a cross-sectional view showing another step of the manufacturing process.

According to the process as described with reference to FIGS. 11 to 20, the cutting of the photoresist 54 by the laser lithography (FIG. 11, FIG. 12), the plating (FIG. 13), the plating exfoliation (FIG. 14) were performed to form the stamper 56 having the shape reverse to the surface shape (grooves 50 and projections 51, projecting portions 20A) of a targeted orientation film. FIG. 31 shows schematically the projections (not shown) and the recess portions 51A which have the reverse shape of the grooves 50 and the projections 51 and the recess portions 51, and the recess portions 92 having the shape reverse to the projecting portions 20A. Here, a negative type or positive type having a thickness of 1.5 $\mu$m may be used as the resist 54.

In this process, a Kr laser having an output power of 250 mW was used as the laser lithography apparatus, and the wavelength of the laser was equal to 413 nm. Further, an acoustooptical modulator (AOM) was used as the optical modulator 62. An objective lens 55 whose magnification is equal to 40 was used as the reducing projecting optical system, and a beam was focused to have a beam diameter of 1 $\mu$m or less on the work. The length $d_1$ of one scan line of the polygon mirror 63 was set to 0.5 mm. An exposure area is determined by a movable distance of the stage, and for example, the exposure covering A4 size at maximum can be performed.

At the exposure time, the focus servo is applied by using a laser beam having a long wavelength which is not sensitive to the resist, for example, by using a He-Ne laser having a wavelength of 633 nm so that the distance between the objective lens and the resist master. With the focus servo, an uniform pattern can be obtained over a large area.

As a result, the pattern shown in FIGS. 7A, 7B, 7C and 11 is exposed. In this example, the pitch of the exposure direction was set to 2 $\mu$m, and the exposure scan interval $d_2$ was set to 0.7 $\mu$m. The orientation force becomes greater as the width (pitch) of the orientation grooves 50 is small and the depth thereof is large, so that the pitch thereof is preferably set to 1 $\mu$m or less. In the optical system as described above, the depth of the grooves is substantially equal to zero if the pitch-of the orientation grooves is set to 0.5 $\mu$m. Therefore, the pitch is preferably set to a value between 0.6 to 1.0 $\mu$m. Further, with respect to the projections 51 having the asymmetric structure, it is preferably as small as possible because the cell gap becomes constant, and thus it is preferably set to 5 $\mu$m or less.

In forming the stamper 56 of FIG. 31, electroless plating of Ni at a thickness of about 70 nm was first conducted on the uneven resist pattern 54 to provide conductivity after the laser lithography for the cases shown in FIG. 13 and FIG. 14. Thereafter, a Ni film was grown to a thickness of 0.2 to 0.6 mm by the Ni electrolytic plating, the resist was dissolved by an organic solvent and then the Ni film was exfoliated to obtain a die member. The thickness of the electroless plating was set to 50 to 100 nm because it was sufficient to provide conductivity.

In the case of the method shown in FIGS. 26A to 26D, nickel 56 was formed at a thickness of 300 $\mu$m on the laser pattern 54 on the glass substrate 53 by plating. Thereafter, the nickel plane was flattened by a tape polishing treatment. A glass substrate of 6 mm thickness was used as a support substrate 84, and the glass substrate and the die member were adhesively attached to each other by two-liquid epoxy resin. In order to promote sufficient hardening, the attached members were left for 10 hours or more. Thereafter, the resist was dissolved from its end portion by acetone, and then exfoliated. With this process, the flatness of the die member after the adhesive attachment was equal to 1 $\mu$m or less per 100 mm.

Figure 32:
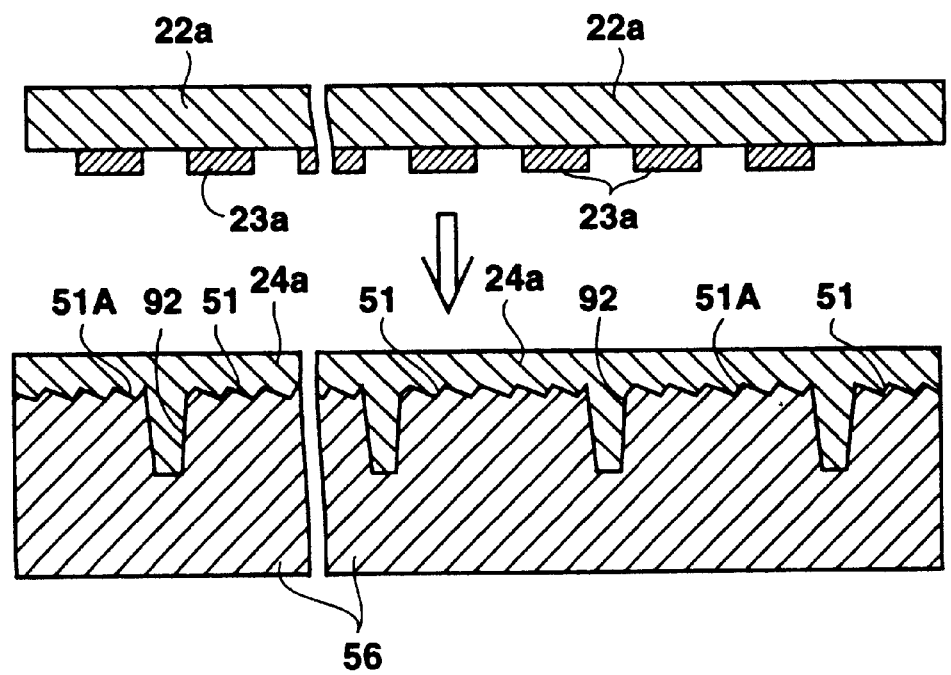
FIG. 32 is a cross-sectional view showing another step of the manufacturing process.
Figure 33:
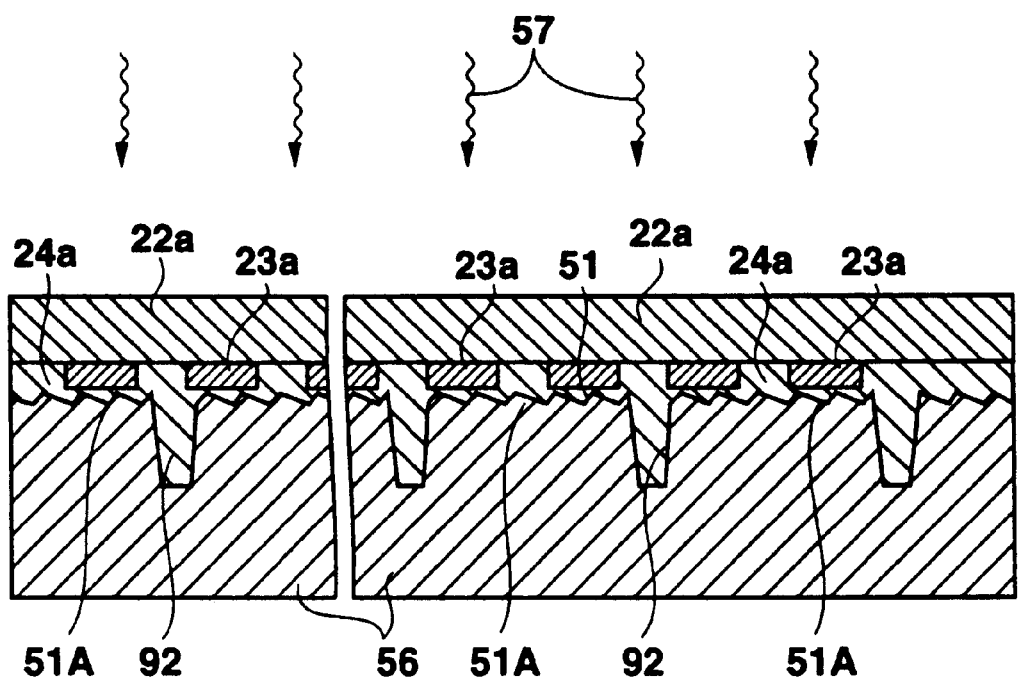
FIG. 33 is a cross-sectional view showing another step of the manufacturing process.

Subsequently, as shown in FIG. 32, ultraviolet-ray curable resin: OVD-005 (produced by Nippon Chemiphar Co., Ltd.) 24 coated on the stamper 56, and overlaid on the electrode 23a side of the substrate 22a so that the resin thickness was equal to 10 $\mu$m or less (however, the resin may be coated on the substrate 22a). In this state, ultraviolet rays were irradiated from the substrate 22a side for 20 to 30 seconds by a metal halide lamp to photocure the resin 24 as shown in FIG. 33.

This copying process could be also performed by using the die member shown in FIG. 22 or FIGS. 24A and 24B. In the case of the die member of FIG. 22, after the laser lithography, Cr was sputtered to a thickness of about 50 nm on the uneven surface of the resist 54, and the UV curable resin was dropped on the surface to enhance the exfoliation property. Subsequently, the glass substrate 22a with the ITO electrode pattern was pressed against the UV curable resin so that the resin thickness was equal to 10 $\mu$m or less. Thereafter, the resin was exposed to UV light for 20 to 30 seconds by the metal halide lamp to be cured and then exfoliated, thereby obtaining a copy substrate. In case the die member shown in FIGS. 24A and 24B was used, after the remover was coated on the stamper 56 (Ni die member) of FIG. 31, Ni electroless plating or electrolytic plating was performed and then the exfoliation was performed to thereby obtain a die member having the reversed shape.

Figure 34:
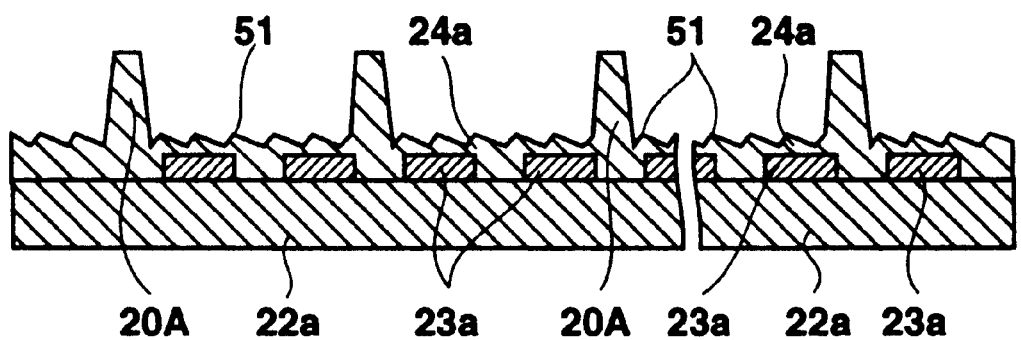
FIG. 34 is a cross-sectional view showing another step of the manufacturing process.

Subsequently, as shown in FIG. 34, the stamper 56 was separated to form the substrate coated with the orientation film 24a which was formed of the ultraviolet-ray curable resin. The orientation film 24a was provided with the shape showing the orientation capability (sawtoothed projections 51 and grooves 50) and also with the pillar structure 20A which was substituted for the spacers. In this case, as shown in a SEM (Scanning Electron Microscope) image of FIG. 35, the pillars 20A have rectangular parallelopiped bodies each of which was 2 $\mu$m in length×3 $\mu$m in width×1.5 $\mu$m in height, and they were mounted on a non-ITO portion so as to be arranged at an interval of 3 $\mu$m along wires 23a of ITO as shown by virtual lines. A large number of arrays of these pillars 20A were provided on the substrate. In this example, the width D of ITO was set to 280 $\mu$m and the interval between the ITO wires 23a—23a was set to 20 $\mu$m, so that the interval between the neighboring pillar arrays was set to 300 $\mu$m.

(4) Formation of Cell (i) Overlay of substrates two glass substrates 22a and 22b each of which was provided with an orientation film 24a (24b) and ITO 23a, 23b were prepared. The two glass substrates were formed so that when the substrates were arranged so that the orientation faces thereof confront each other, the arrangement directions of the sawtoothed projections 51 of these substrates are anti-parallel to each other and the lines of the ITOs thereof were perpendicular to each other. For one of the two substrates, ultraviolet-ray curable resin (UV-1000: produced by Sony Chemical Co., Ltd.) was coated on the orientation film at the outside of the display portion by a screen printing method, and then the two substrates were assembled and ultraviolet rays were irradiated to the resin to obtain a cell having a gap of 1.5 µm.

(ii) Enforcement of cell

Since the size of the substrate used in this example is equal to 6 cm×7 cm, the strength of the cell is substantially sufficient by the adhesion of the substrate shown in the preceding paragraph (i). However, in order to obtain a large-area display device, the fixation of the two glass substrates becomes critical. In this example, after (i), an excimer dye laser was focused from the cell surface through a lens to the pillar structure 20A formed in the orientation film so that the laser beam was sufficiently small, whereby the substrate 22b confronting the pillars and the substrate 22a were fused to each other. The number of irradiation portions of the excimer dye laser was set to five portions per 1 cm² cell.

This fusion enables the substrates to be fixed to each other, and can solve the problem of enlargement of the gap between the substrates (particularly, at the lower portion when a device is erectly mounted) due to gravitation when the liquid crystal display device is designed to become large sized. Further, it enables the substrate to be made like a film.

In this example, irradiation was performed on five portions per 1 cm² cell to strengthen the cell. However, this is an example, and the number of irradiation portions may be reduced to enhance the productivity with keeping sufficient strength in the cell. Further, before the two substrates are adhesively attached to each other, one or both of the substrates may be subjected to the silane coupling treatment or titanium coupling treatment to enhance the adhesion of the two substrates.

(5) Injection of Liquid Crystal

Figure 36:
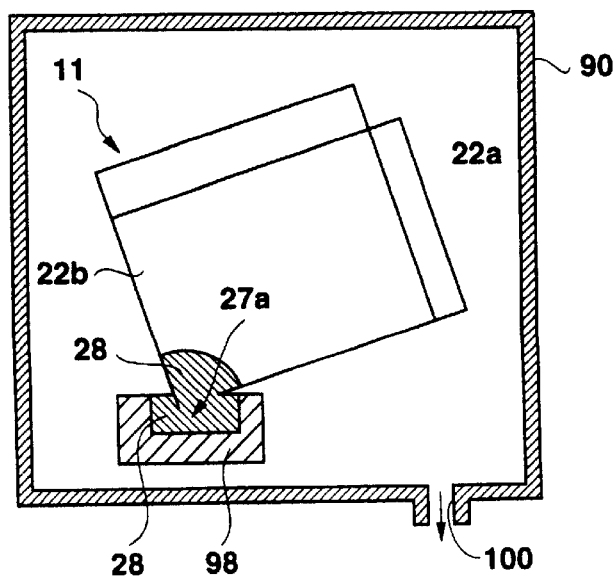
FIG. 36 is a cross-sectional view showing another step of the manufacturing process.

As shown in FIG. 36, the cell 11 was left in a vacuum within a vacuum device 90 to remove air in the gap between the pair of substrates 22a and 22b. The liquid crystal 28 was obtained by leaving ferroelectric liquid crystal CS-1014 (produced by Chisso Corporation) under vacuum at 60° C. (smectic A phase) for 1 hour in the vacuum equipment 90 to sufficiently deform dissolved air. The cell and the liquid crystal were heated to 100° C. to set the liquid crystal to an isotropic phase. In this state, an inlet port 27a provided at a portion of the cell is immersed in the liquid crystal 28 in a boat 98. The above operation was performed while keeping the vacuum (under degree of vacuum below 1 mmHg). After it was confirmed that the liquid crystal 28 started to enter the gap of the cell and the inlet port 27a was closed, air of 100° C. was introduced into the vacuum device 90 to accelerate the injection.

After the liquid crystal 28 was completely filled in the gap, the cell 11 was removed from the vacuum device 90, the ITO electrode was connected to a driving circuit, and it was pinched by a temperature-controllable hot plate. The cell was cooled at a rate of 3° C./minute, and when the liquid crystal showed smectic A phase, the electric field of each pattern: +30V, 50 µsec; −30V, 50 µsec; 0V, 5 msec; −30V, 50 µsec; +30V, 50 µsec; and 0V, 5 msec was applied to the whole surface of the cell until the cell was cooled to the room temperature.

By applying the electric field as described above, the subsequent switching operation could be performed with a voltage of about 30V.

When such electric field was not applied, or where a twist orientation was obtained as a result of application of the electric field, the switching operation could be performed with a voltage of about 30V by supplying a rectangular wave of ±70V, 100 Hz until the liquid crystal on the whole surface of the cell performed its switching operation after the cell was cooled to room temperature.

Next, an improvement of the angle of visibility in a direction along the orientation grooves 50 as described above will be described.

Figure 37A:
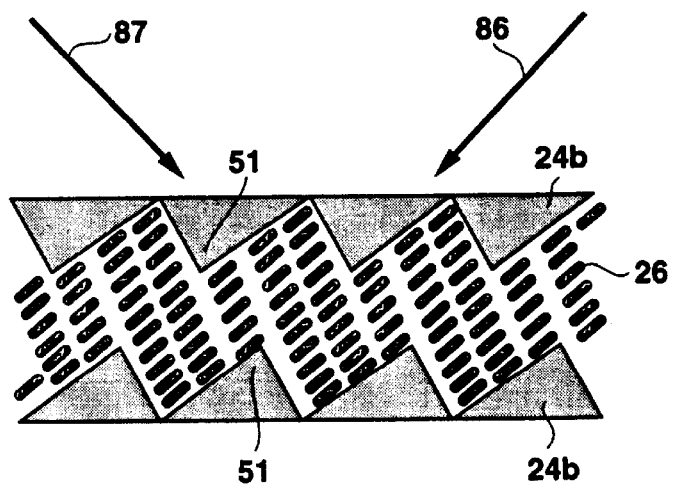
FIG. 37A is a cross-sectional view showing an angle of visibility of the liquid crystal display device.

FIG. 37A represents the section of the substrate in the direction along the orientation grooves. Like the case of FIGS. 7A to 8C, the ferroelectric liquid crystal molecules 26 has a layered structure having a pre-tilt angle to the surface of the substrate. In this case, a view from the direction of an arrow 87 corresponds to a view from the longitudinal side of the liquid crystal molecules, and thus a wide angle of visibility can be obtained. On the other hand, a view from the direction of an arrow 88 corresponds to a view from the head side of the liquid crystal molecules, and thus the angle of visibility is small.

Figure 37B:
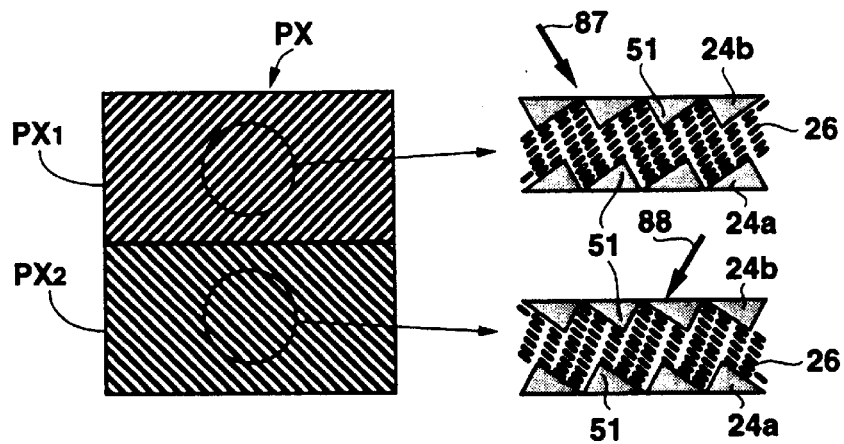
FIG. 37B is a plan view and a cross-sectional view of picture elements, showing a structure enhancing the angle of visibility.

Therefore, as shown in FIG. 37B, one picture element PX is divided into two parts $PX_1$ and $PX_2$, for example, and the liquid orientation direction is inverted at each picture element portion. With this construction, characteristics such as inversion, black smear, white void, etc. can be compensated. Therefore, the same visibility can be obtained from any direction of the arrows 87 and 88, and the angle of visibility becomes large. The same effect can be also obtained for TN liquid crystal, and this effect is more enhanced for liquid crystal having a larger pre-tilt angle.

When the structure shown in FIG. 37B is formed on a rubbing film, the rubbing direction is required to be varied. In order to satisfy this requirement, the film must be subjected to the rubbing treatment while masked with a resist, resulting in increase of the number of processes. Further, the orientation performance is deteriorated in a resist coating process, a developing process and an exfoliating process. On the other hand, with respect to the laser lithography according to the present invention, the direction of the asymmetric structure in each picture element can be easily varied by changing a modulation signal to be applied at the exposure time.

Actually, on the condition that the size of one picture element was set to 300 µm in square, the scan width of the polygon mirror was set to 300 µm and the width of the orientation grooves was set to 0.6 µm, the modulation signal was switched so that the direction of the saw-toothed waveform was inverted by 180 degrees when the orientation grooves were drawn over a width of 150 µm (250 grooves). In this case, the picture element is divided into two parts in the feeding direction, however, the picture element can be divided into two parts along the scan direction by switching the signal at the position where the scan is performed by 150 µm in the scan direction. The number of divided parts and the ding pattern of the picture element can be variously changed. At any rate, the picture element may be varied into plural parts so that the asymmetric structures (projections 51) are different within one picture element (preferably, inverted).

The integration of the pillars 20A to keep the gap (cell gap) between the cell substrates 22a and 22b will be described.

As described above, the uneven shape of the liquid crystal orientation film can be obtained by modulating the intensity of a laser beam, and by changing the modulation signal, the integration of the pillars to keep constant the gap between the liquid crystal cells can be performed in addition to the uneven shape. This method has the following merits:

(1) a spacer coating process for cell fabrication is unnecessary.

(2) The location, density and shape of the spacer can be set to any ones.

Figure 35:
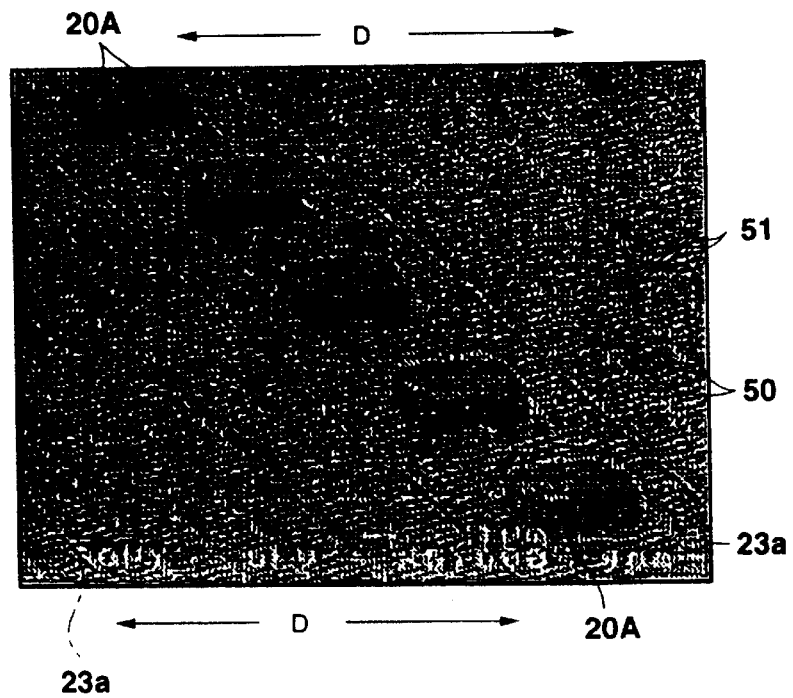
FIG. 35 is an SEM image of the surface shape of the orientation film corresponding to FIG. 34.

(3) When the spacers are located between ITO electrodes, the device can be designed so that no spacer exists in the picture element (see FIG. 35).

In the related art, silica balls are scattered as the spacers, however, it has been difficult to scatter these silica balls so that they are uniform and individually sufficiently separate from one another.

Figure 38A:
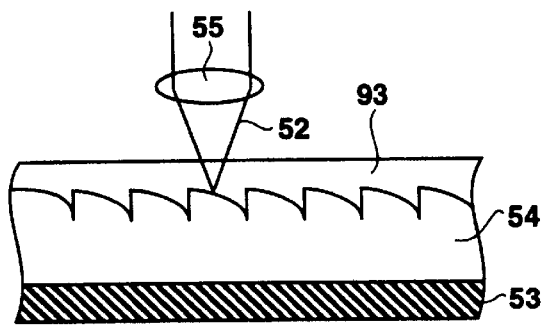
FIGS. 38A through 38F are cross-sectional views sowing a series of steps of a method of forming projections (pillars) to keep the cell gap of the liquid crystal display device.
Figure 38D:
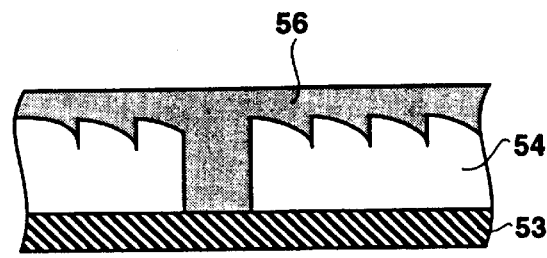
Figure 38B:
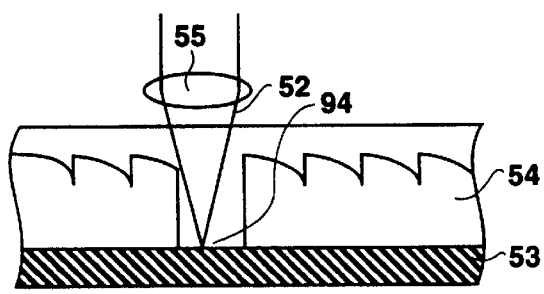
Figure 38E:
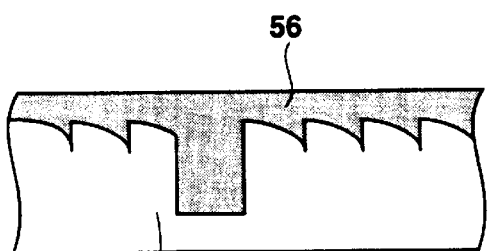
Figure 38C:
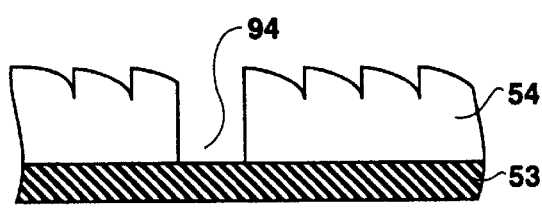

A method of forming the pillars 20A is shown in FIGS. 38A to 38F. First, as shown in FIG. 38A, the resist 54 is coated on the glass substrate 53, and an exposure process is performed by the laser lithography to form a liquid crystal orientation structure 93. Subsequently, as shown in FIG. 38B, an exposure process is performed to form a pillar structure 94, and then developed (FIG. 38C). When a positive type resist 54 is used, an integrated structure having a concave pillar structure pillar structure can be obtained.

Figure 38F:
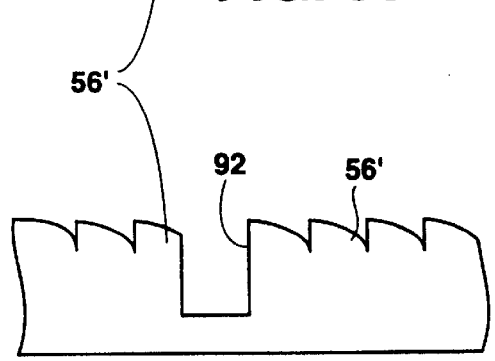

The pillars may be formed by any one of exposing methods other than the laser lithography, such as a mask exposing method, a hologram exposing method, etc., or they may be simultaneously formed by performing the laser lithography only once. As shown in FIG. 38D, the die member 56 is formed according to the method as described above, and then inverted to obtain a die member 56' with recess portions 92 for the pillar structure (FIGS. 38E, 38F). In the cell fabrication, the pillars may be provided to any one of the liquid crystal orientation substrates, and thus a copy substrate having pillars and a copy substrate having no pillars are attached to each other (see FIG. 7).

The pillars may be formed in a pillar shape, a wall shape or a column shape. The size of the pillars is preferably set so that the width and depth thereof are equal to 0.5 $\mu$m or more and the overall size thereof is smaller than a picture element to obtain sufficient intensity. The pillars are preferably arranged between picture elements so that turbulence in the orientation of liquid crystal in the vicinity of the pillars is made unremarkable.

Specifically, a resist 54 of 1 to 3 $\mu$m thickness was coated on the glass substrate 53. A saw-tooth shape having a pitch of 2 $\mu$m was formed by a first laser exposure, and a pillar shape was formed by a second laser exposure. At this time, the laser power was set to 2.5 mW, and the pillar size was set to 3×3 $\mu$m. The pillars were arranged at intervals of 300 $\mu$m. Thereafter, the die member 56 was formed by the nickel electroless plating, the electrolytic plating, and the die member 56' of nickel which was inverted through the plating was obtained. The plating thickness of each die member was set to 300 $\mu$m. The pattern copy was performed by dropping UV resin onto the inverted die member 56', pressing a glass substrate having an ITO electrode against the UV resin and then irradiating UV beams to the UV resin for several tens seconds to cure the UV resin.

Next, the integration of the separation walls to separate domains (picture element) will be described.

As shown in FIGS. 39A, 39B, 40 and 41, the domain separation walls 95 for separating the picture elements from one another can be integrated by using the same method as described above. The domain separation wall 95 is provided between picture elements, and the operation of the liquid crystal of a picture element is depressed to effect the operation of the liquid crystal of its neighboring picture element.

Figure 39A:
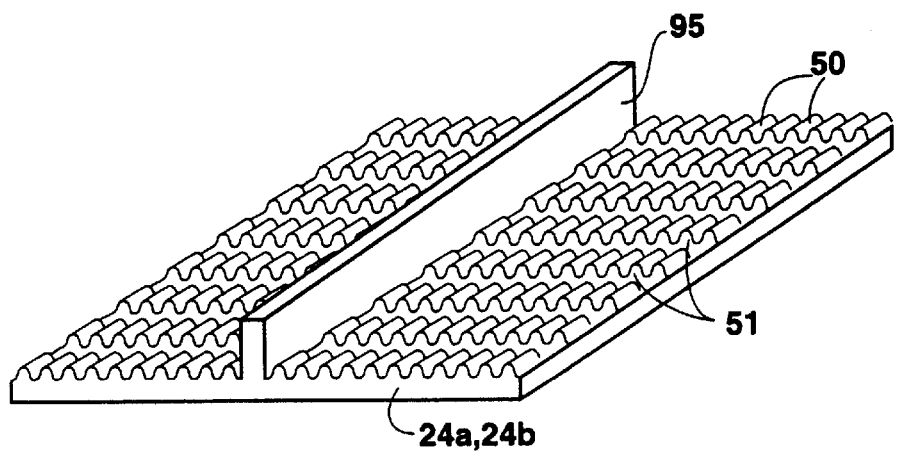
FIGS. 39A and 39B are perspective views showing a main part of a picture element separation wall of the liquid crystal display device with a cross-sectional view thereof.
Figure 39B:
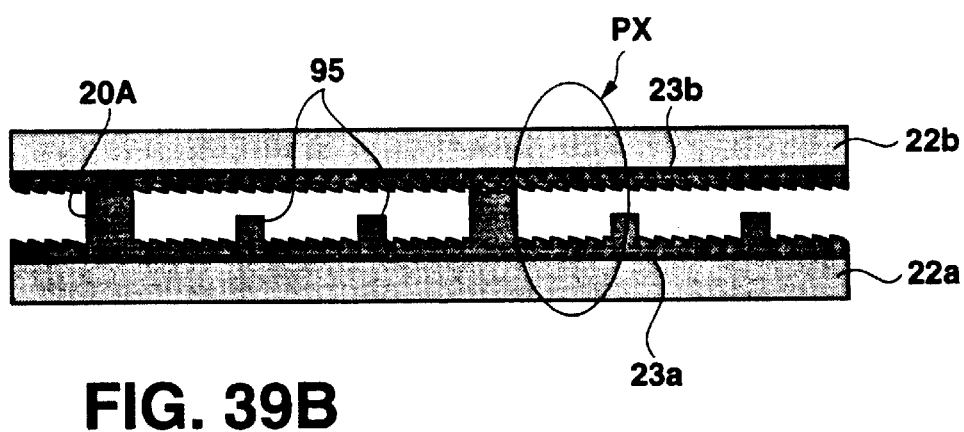
Figure 40:
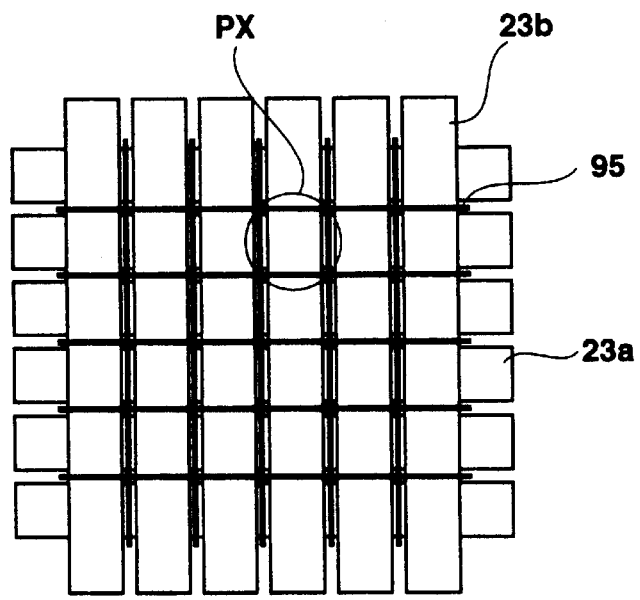
FIG. 40 is a plan view showing a main part of the liquid crystal cell having the picture element separation wall.
Figure 41:
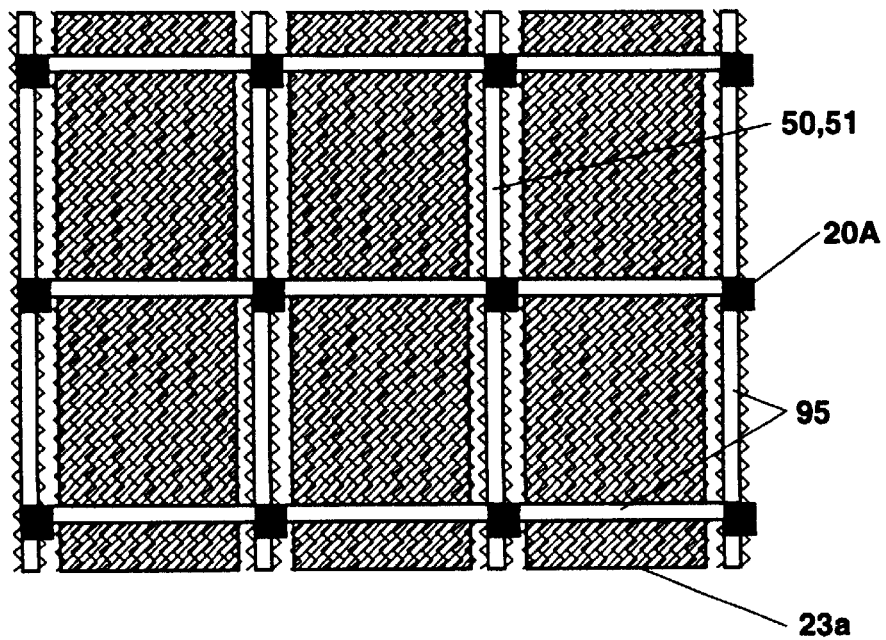
FIG. 41 is an enlarged view showing a picture element portion of the main part.

The separation walls 95 may be designed as a wall type as shown in FIG. 39A and FIG. 39B, or as a linkage of columnar or trapezoidal pillars. These separation walls 95 are arranged between the picture elements as if the pillars 20A located at the non-existing area of the ITO electrodes are linked through the separation walls 95. FIG. 40 shows an arrangement of the scanning electrodes of a simple matrix when the cell is fabricated. An overlap portion between upper and lower electrodes corresponds to a picture element.

Therefore, the separation walls 95 are disposed between the electrodes, and also are formed at one side or both sides of the liquid crystal substrates to be fabricated.

The height of the domain separation walls 95 is preferably set to one-fourth to three-fourths (for example, half) of the cell gap. If the height of the separation walls is lower than the above range, the operation of the liquid crystal of a picture element is liable to be effected by its neighboring picture element (cross-talk occurs). On the other hand, if the height of the separation walls is higher than the above range, these separation walls act to obstruct injection of the liquid crystal into the cell gap. Further, the width of the domain separation walls 95 is preferably set to 10 $\mu$m or less because it is unfavorable that the separation walls 95 protrude to the picture elements.

Specifically, pattern exposure was performed to form a pattern of grooves 50 for controlling the liquid crystal orientation, and then the pattern exposure was performed to form a pattern of pillars for controlling the cell gap. The interval of the pillars was set to the same value as the picture element pitch (300 $\mu$m), the size of the pillars was set to 3×3 $\mu$m, and the height thereof was set to 1.5 $\mu$m. Thereafter, the pattern exposure was performed as if the pillars are linked (FIG. 40). The width and height of the pillars was set to 1.5 $\mu$m and 0.5 $\mu$m respectively. The pillars were arranged between the ITO transparent electrodes.

Orientation Characteristic of Liquid Crystal Based on Orientation Film Material (Examples 1 to 6)

(1) Materials Used to Form an Orientation Film

The orientation characteristic of the liquid crystal when the orientation film material of the liquid crystal display device 11 was varied was considered. The following five kinds of materials were used as the orientation material:

Example 1: OVD-005 (produced by Nippon Chemiphar Co., Ltd.)

Example 2: SK-23 (produced by Nippon Zeon Co., Ltd.)

Example 3: Dai Cure Clear SD-17 (hereinafter merely referred to as SD-17) (produced by Dainippon Inc & Chemicals, Inc., the following two materials were produced also by the same company)

Example 4: Dai Cure Clear SD-2200 (hereinafter merely referred to as SD-2200)

Example 5: Dai Cure Clear SD-318 (hereinafter merely referred to as SD-318)

All of these materials are ultraviolet-ray curable resin.

(2) Measurement of Contact Angle

Figure 42:
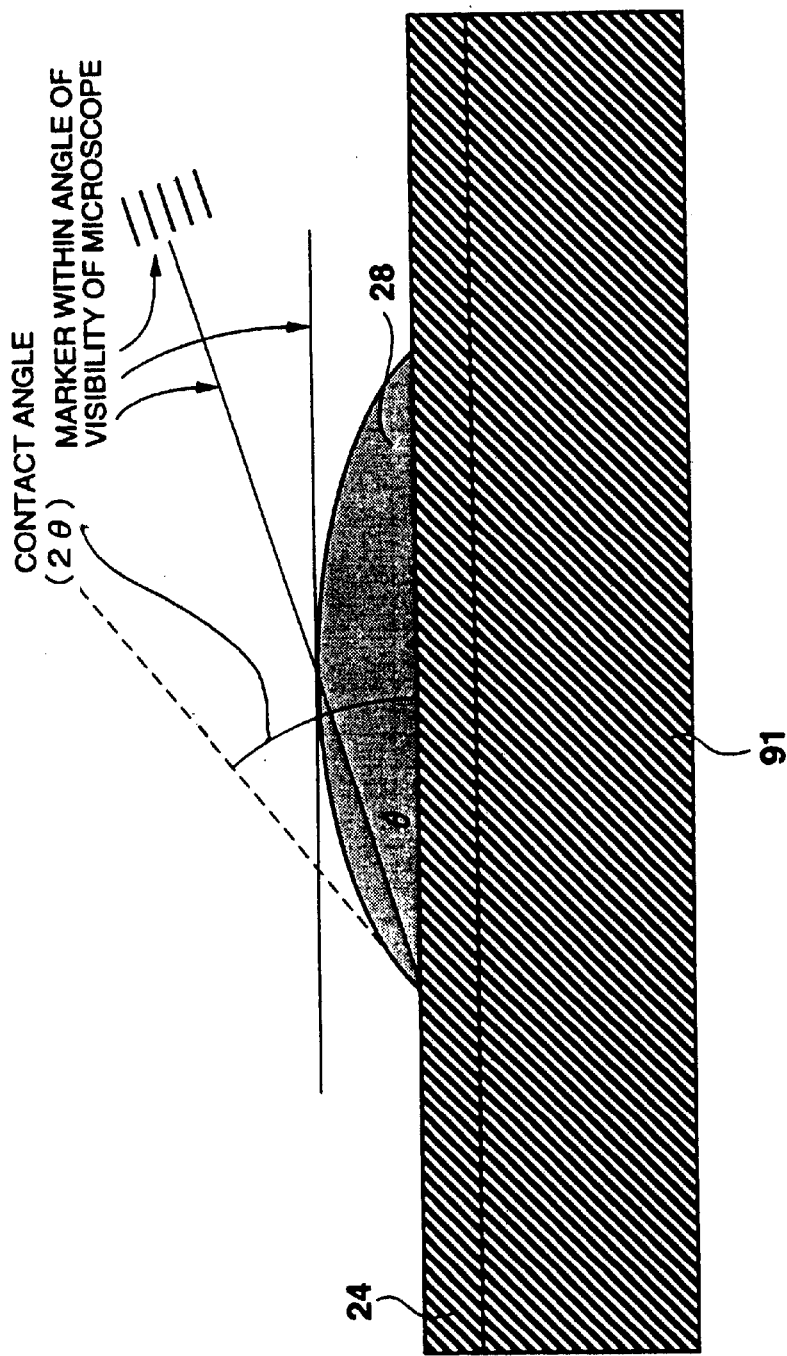
FIG. 42 is a schematic cross-sectional view showing a contact angle of the liquid crystal to the orientation film.

The contact angle representing wettability between the liquid crystal and the orientation film was measured. FIG. 42 shows the measurement method schematically. That is, the orientation film material 24 as described above was spin-coated on a flat glass substrate 91, and cured by ultraviolet-ray irradiation to obtain a flat film of the orientation film. CS-1014 was dropped on the film through a fine needle. At this time, both the liquid crystal 28 and the substrate 91 were kept at 100° C. (CS-1014 was kept in isotropic phase). The amount of dropping was set to be as small as possible. This was because the shape of the droplet of the liquid crystal on the film was prevented from being affected by gravitation.

The edge portion of the droplet 26 on the film 24 was observed with a microscope to measure the contact angle. The microscope has a marker in a visual field thereof to facilitate the measurement of an angle θ. The contact angle is obtained as two times the angle θ. The measured contact angles are as follows.

| | OVD-005 | SK-23 | SD-17 | SD-2200 | SD-318 |
|---|---|---|---|---|---|
| contact angle(°) | 5.5 | 16.8 | 39.8 | 42.1 | 49.9 |

(3) Formation of Liquid Crystal Device

Separately from samples for the measurement of the contact angle, a liquid crystal device was formed by the method as described above. For test, liquid crystal was injected into a cell which was formed by a substrate having a 1 cm×1 cm electrode on 3 cm×4 cm glass to form a test device. With respect to the shape of the orientation film, the pitch of the grooves 50 (the distance between the centers of the neighboring grooves) was set to 0.7 μm, and the pitch of the sawtoothed projections 51 was set to 2.0 μm. The minimum radius of curvature of the recess portions of the grooves 50 was set to 0.18 μm.

As a result, when SD-17, SD-2200, SD-318 was used as the orientation film, it was difficult to introduce the ferro-electric liquid crystal CS-1014 into the cell. Even if CS-1014 could be introduced into the cell, in some cases, the major axes of the liquid crystal molecules were liable to direct to the perpendicular orientation, and thus it was impossible to drive the device.

On the other hand, when OVD-005 or SK-23 was used as the orientation film, it was possible to introduce CS-1014 into the cell. Further, with a polarization microscope in which a polarizer and an analyzer are disposed in a cross-nicol arrangement, it could be confirmed by a polar that the liquid crystal had uniaxial orientation.

It is possible to manufacture a liquid crystal element which sometimes become unable to be driven when the contact angle of the liquid crystal on the orientation film is about 40° or more but when it is less than 17°, the ferro-electric liquid crystal has uniaxial orientation.

Accordingly, the results can be summarized as set forth in the following table:

| Contact Angle (degrees) | −5.5 – 16.8 | 39.8 – 42.1 – 49.9 |
|---|---|---|
| | OK | No Good |
| Liquid Crystal Alignment | Uniaxial Orientation | Could Not Be Driven |

(4) Temperature Characteristic of Driving

Figure 43:
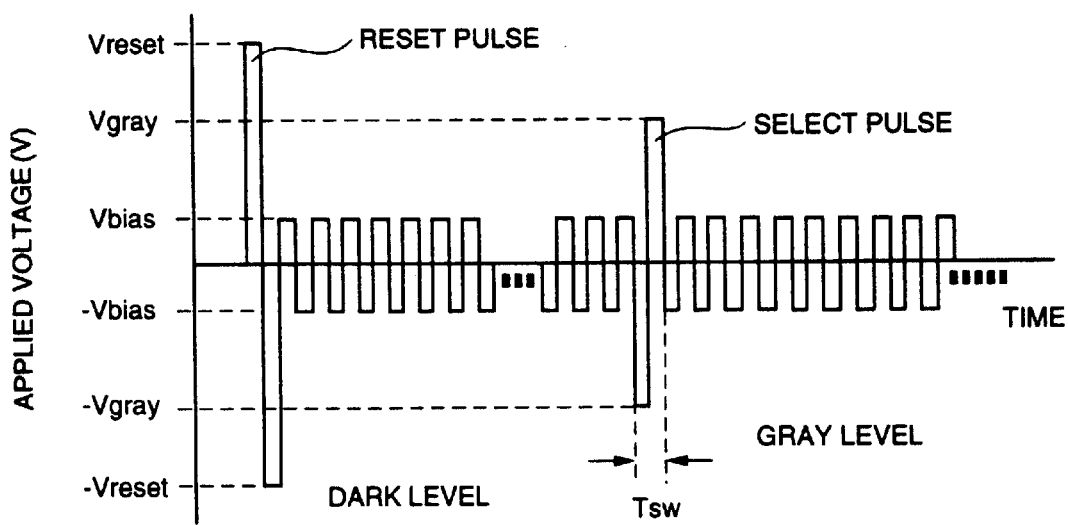
FIG. 43 is a waveform diagram of the driving voltage of the liquid crystal display device.

The driving was performed with a voltage having the waveform shown in FIG. 43 and by the simple matrix system. Two gradations of white and black were used, and thus Vreset=Vgray.

First, after black was displayed by a reset pulse, white was displayed by a select pulse. At this time, the voltage of the select pulse was made variable, and the temperature-dependency of the select voltage (threshold voltage) for the shift from black to white was examined.

Figure 44:
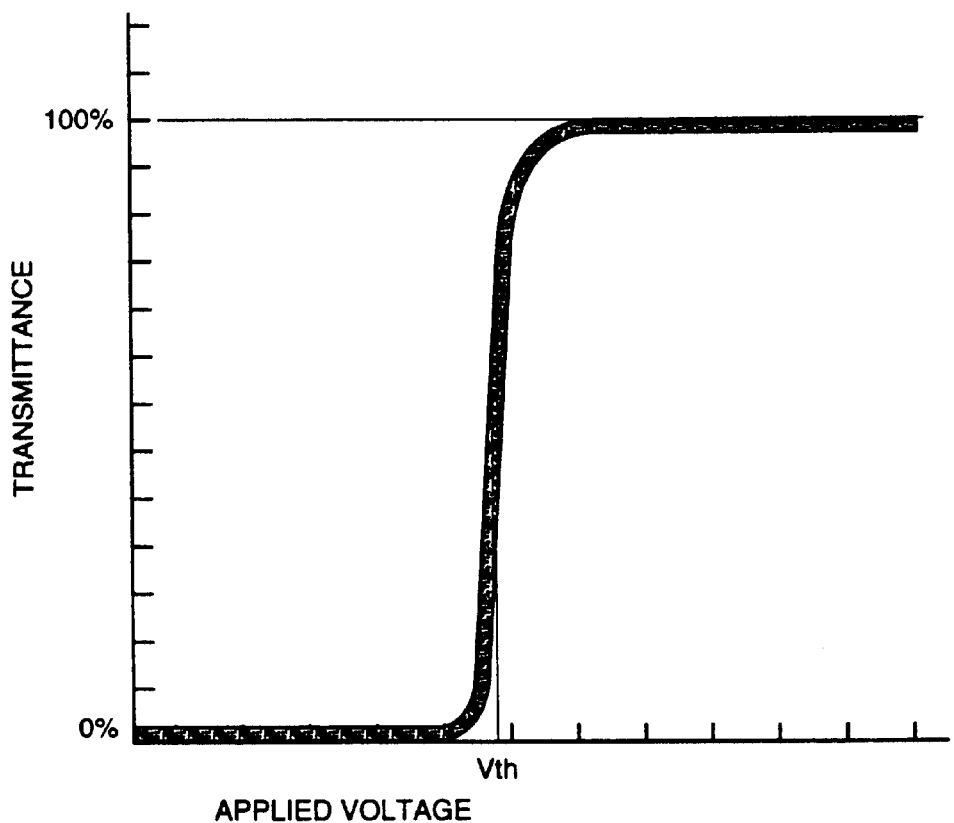
FIG. 44 is a diagram showing a transmittance-applied voltage characteristic showing a threshold voltage characteristic of the liquid crystal display device.

As a result, the threshold voltage at the time when OVD-005 was used as the orientation film (see FIG. 44) varied within 1V in a temperature range of 20 to 50° C. (note: transition point for shift from smectic C phase to smectic A phase is 5420 C.). On the other hand, when SK-23 was used, the threshold voltage varied above 2V or more in the same temperature range.

The temperature-dependency of the threshold voltage as described above is not so critical when a desired liquid crystal display device is of two-gradation display type. However, it may become critical for a multi-gradation display type in which the gradation is controlled by the select voltage. That is, if the temperature-dependency of the threshold voltage is large, the intermediate gradation is not surely determined.

If the contact angle of the liquid crystal is large, the liquid crystal molecules have a pre-tilt angle larger than a tilt angle (raising angle due to sawtoothed projections 51) which is defined by the orientation film having the grooves 50 and the sawtoothed projections 51. The chemical interaction between the orientation film material and the liquid crystal molecules is the main cause of the pre-tilt angle being larger than the tilt angle, and in this case, the temperature-dependency of the pre-tilt angle is large. Conversely, if the contact angle of the liquid crystal is small, the liquid crystal molecules have a pre-tilt angle which is substantially equal to the tilt angle due to the sawtoothed projections 51. In other words, the pre-tilt angle is determined necessarily in accordance with the shape of the sawtoothed projections 51, and there is no or little temperature-dependency.

Figure 45:
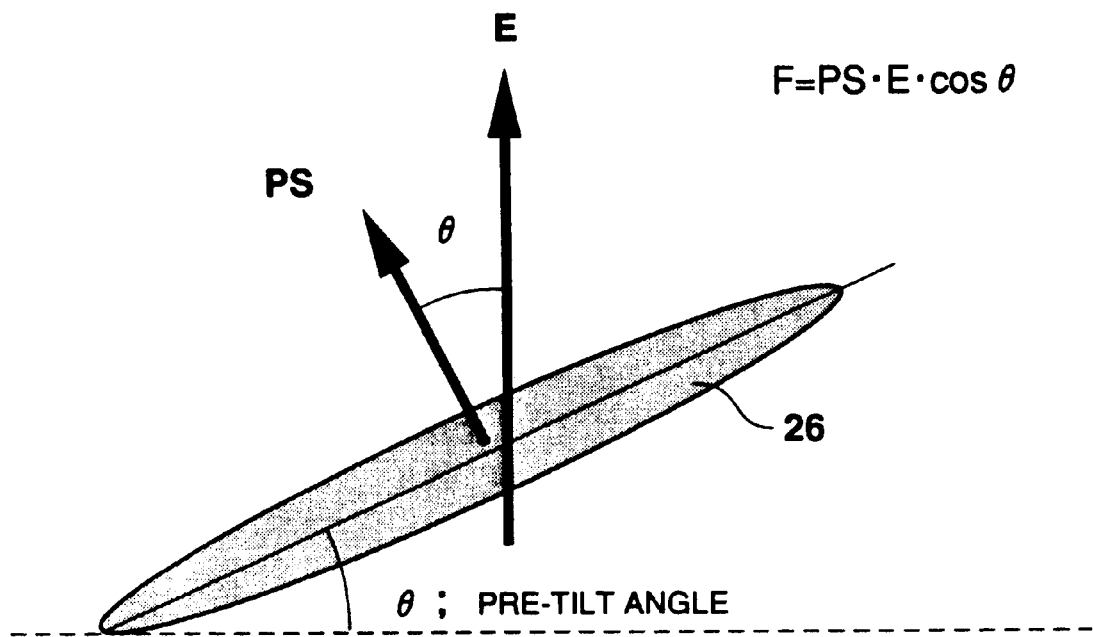
FIG. 45 is a schematic diagram showing the interaction between the spontaneous polarization of the ferroelectric liquid crystal and the electric field.

The switching operation of the ferroelectric liquid crystal is induced by the interaction between the spontaneous polarization PS inherent to the liquid crystal molecules and the electric field E. The strength thereof corresponds to the inner product of the spontaneous polarization and the electric field, and as is apparent from FIG. 45, it is dependent on the pre-tilt angle. That is, by selecting a material having a small contact angle as the orientation film material or the surface material contacted with the liquid crystal, a liquid crystal display device in which the temperature-dependency of the threshold voltage is small, and the switching operation is easily performed. Therefore, such a liquid crystal display device is suitable for performing the multi-gradation display in one picture element with the ferroelectric liquid crystal.

(5) Surface Reformation of Orientation Film (Example 6)

When SD-17 was used as the orientation film, ultraviolet rays having short wavelength were irradiated to reform the surface of the orientation film. After the orientation film was formed, the sample was washed and exposed to low-pressure mercury lamp (trade name SUV-200 GS: produced by Sen Light Corporation). The irradiation time was set to 120 seconds. The variation of the surface shape of the orientation film due to the ultraviolet-ray radiation through SEM observation was not observed.

By the surface treatment as described above, the wetta-bility of SD-17 (the contact angle to the liquid crystal) can be varied. The wavelength of the irradiated ultraviolet rays was mainly 189.4 nm, 254 nm. Since the energy of the ultraviolet rays is larger than some kinds of coupling energy in the molecules (for example, C—C, C—H, O—H, etc.), the chemical bonding in the vicinity of the surface is broken, and the polarity of the surface is enhanced by reaction with oxygen in air to thereby enhance the wettability.

In the liquid crystal display device having the orientation film of SD-17 whose surface was subjected to the ultraviolet-ray radiation, the liquid crystal was oriented at a cone angle of 42 degrees with the direction of the grooves 50 at the center of the orientation, and it could be driven with a voltage of 30V. Further, with respect to an electrooptical characteristic, the threshold voltage for the shift from black to white was substantially constant in the temperature range of 20 to 50° C.

This method of the surface treatment is applicable not only to the plastic surface, but also to the glass surface, the metal surface and oxide such as ITO, SiO or the like. Accordingly, there can be used any material like SD-17, which is excellent in its formation performance and with which the cost can be reduced, but which cannot be directly used because of its low wettability. With respect to the insulating film, any material is applicable to the liquid crystal display device according to the present invention insofar as it satisfies film formation performance and insulation. With respect to the wettability, no restriction would be imposed on these materials if the surface reformation is made thereon.

Furthermore, the wettability of the surface can be improved by the silane coupling treatment or titanium coupling treatment in place of the radiation of ultraviolet rays having short wavelength. Alternatively, a thin film formed of another kind of material having excellent wettability may be formed to improve the wettability of the surface.

Orientation Characteristic of Liquid Crystal Due to Surface Shape of Orientation Film (Examples 7 to 39)

(1) Formation of Test Device

Orientation films having various surface shapes were formed by the method as described above. For the test, liquid crystal was introduced into a cell formed by a substrate in which a 1 cm×1 cm electrode was provided on a 3 cm×4 cm glass. OVD-005 was used as the orientation film material.

The pitch of the sawtoothed projections 51 was set to 2 $\mu$m. The pitch (TP) of the grooves 50 was varied every 0.1 $\mu$m in the range of 0.5 to 1.0 $\mu$m to prepare six kinds of pitches. The minimum radius of curvature of the recess portions of the grooves was controlled by changing the laser intensity in the laser cutting process. The following table 1 shows examples 7 to 38 when the laser power and TP are set to specific values, respectively.

Five kinds of laser power of 1.0 mW, 1.5 mW, 2.0 mW, 2.5 mW and 3.0 mW were prepared, and the minimum radius of curvature of the recess portions of the grooves 50 was set to 0.12 $\mu$m at minimum and 0.47 $\mu$m at maximum. The following tables 2 to 4 show the matrix of the radius of curvature, the groove depth and the depth of the sawtoothed structure (the unit is $\mu$pm for all) (based on TP and irradiation laser power) which were obtained on the basis of a SEM image of the section of the orientation film. Each value of the tables 2 to 4 corresponds to each example of the table 1.

FIG. 46A and FIG. 46B respectively show the SEM image and the STM image of the surface of the orientation film having the grooves 50 and the sawtoothed projections 51 (SEM: Scanning Electron Microscope, STM: Scanning Tunneling Microscope).

TABLE 1

(CONDITIONS OF EACH EXAMPLE)

| LASER | PITCH TP OF GROOVES 50 | | | | | |
|---|---|---|---|---|---|---|
| POWER | 0.5 $\mu$m | 0.6 $\mu$m | 0.7 $\mu$m | 0.8 $\mu$m | 0.9 $\mu$m | 1.0 $\mu$m |
| 0.5 mW | — | — | — | — | EX.18 | EX.37 |
| 1.0 mW | EX.29 | EX.7 | EX.9 | EX.13 | EX.19 | EX.24 |
| 1.5 mW | EX.30 | EX.8 | EX.10 | EX.14 | EX.20 | EX.25 |
| 2.0 mW | EX.31 | EX.33 | EX.11 | EX.15 | EX.21 | EX.26 |
| 2.5 mW | EX.32 | EX.34 | EX.12 | EX.16 | EX.22 | EX.27 |
| 3.0 mW | EX.38 | EX.35 | EX.36 | EX.17 | EX.23 | EX.28 |

*The examples 7 to 28 are preferable, the examples 29 to 37 are not so preferable, and the example 38 is a defective.

TABLE 2

(RADIUS OF CURVATURE r: UNIT $\mu$m)

| LASER | PITCH TP OF GROOVES 50 | | | | | |
|---|---|---|---|---|---|---|
| POWER | 0.5 $\mu$m | 0.6 $\mu$m | 0.7 $\mu$m | 0.8 $\mu$m | 0.9 $\mu$m | 1.0 $\mu$m |
| 0.5 mW | — | — | — | — | 0.10 | 0.08 |
| 1.0 mW | 0.27 | 0.16 | 0.16 | 0.16 | 0.12 | 0.12 |
| 1.5 mW | 0.29 | 0.16 | 0.16 | 0.16 | 0.16 | 0.15 |
| 2.0 mW | 0.33 | 0.18 | 0.18 | 0.16 | 0.18 | 0.15 |
| 2.5 mW | 0.41 | 0.27 | 0.25 | 0.22 | 0.18 | 0.19 |
| 3.0 mW | * | 0.47 | 0.26 | 0.26 | 0.23 | 0.25 |

*No groove

TABLE 3

(GROOVE DEPTH $D_1$: UNIT $\mu$m)

| LASER | PITCH TP OF GROOVES 50 | | | | | |
|---|---|---|---|---|---|---|
| POWER | 0.5 $\mu$m | 0.6 $\mu$m | 0.7 $\mu$m | 0.8 $\mu$m | 0.9 $\mu$m | 1.0 $\mu$m |
| 0.5 mW | — | — | — | — | 0.233 | 0.211 |
| 1.0 mW | 0.078 | 0.167 | 0.256 | 0.222 | 0.278 | 0.222 |
| 1.5 mW | 0.111 | 0.233 | 0.317 | 0.422 | 0.372 | 0.389 |
| 2.0 mW | 0.089 | 0.172 | 0.394 | 0.611 | 0.611 | 0.594 |
| 2.5 mW | 0.050 | 0.100 | 0.344 | 0.722 | 0.806 | 0.833 |
| 3.0 mW | 0 | 0.083 | 0.206 | 0.600 | 0.961 | 1.000 |

TABLE 4

(HEIGHT $D_2$ OF SAWTOOTHED PROJECTIONS: UNIT $\mu$m)

| LASER | PITCH TP OF GROOVES 50 | | | | | |
|---|---|---|---|---|---|---|
| POWER | 0.5 $\mu$m | 0.6 $\mu$m | 0.7 $\mu$m | 0.8 $\mu$m | 0.9 $\mu$m | 1.0 $\mu$M |
| 0.5 mW | — | — | — | — | 0.172 | 0.167 |
| 1.0 mW | 0.300 | 0.211 | 0.222 | 0.256 | 0.222 | 0.278 |
| 1.5 mW | 0.467 | 0.389 | 0.400 | 0.411 | 0.400 | 0.422 |
| 2.0 mW | 0.689 | 0.633 | 0.611 | 0.656 | 0.611 | 0.611 |
| 2.5 mW | 0.933 | 0.867 | 0.789 | 0.900 | 0.756 | 0.778 |
| 3.0 mW | 0.944 | 0.944 | 0.889 | 0.889 | 0.844 | 0.889 |

Further, as a comparative example (Ex.39), a test device was formed by using the laser holography (based on Japanese Laid-open Patent Application No. Hei-5-188377). The shape was set so that TP=0.7 $\mu$m, the pitch of the sawtoothed projections 51=2.0 $\mu$m, the depth of the grooves 50=0.07 $\mu$m, the height of the sawtoothed projections 51=0.1 $\mu$m, and the radius of curvature of the grooves 50=0.02 $\mu$m, and the other conditions were identical to those of the Examples 7 to 28.

(2) Driving Characteristic

The driving characteristic of the test devices of the Examples 7 to 28 were estimated. The driving was performed with the waveform shown in FIG. 43 by the simple matrix system. The threshold voltage of the select voltage for the shift from the black to white was equal to 21V to 34V, and an excellent memory property was shown by application of a voltage above the threshold voltage.

A uniaxial accessary plate was put into, or taken out from the gap between two polarizers in a polarization microscope in which the polarizers were disposed in a cross-nicol arrangement in order to detect the orientation direction of the liquid crystal in the device. As a result, it was found out that the liquid molecules moved on a virtual cone around the direction of the grooves 50 of the orientation film. This indicates that the control of the pre-tilt angle by the sawtoothed structure can be performed.

The orientation direction and the driving characteristic of the test devices of the Examples 29 to 39 were estimated with the same method as described above. In the case of the devices of the comparative example (Example 39), the orientation direction corresponded to the direction of the grooves 50 of the orientation film, and no switching operation from black to white was observed even by applying a select voltage of 50 V at maximum. Further, even when a response characteristics measurement of the variation of the intensity of transmitted light by a photomultiplier tube was performed, the switching operation under application of a voltage (not memory) was not observed. That is, it is found out that surface anchoring to the liquid crystal molecules by the grooves 50 is excessively strong.

In the devices of the Examples 29 to 38, it was found out that the liquid crystal molecules move on a virtual cone mainly in the vertical direction with respect to the grooves 50. In these devices, many defects have been observed in picture elements because there was no or little pre-tilt angle. Further, in the example 38 (corresponding to Japanese Laid-open Patent Application No. Hei-5-249465), the switching operation was carried out under application of reset and select voltages, however, it had no memory effect. When the voltage was equal to 0V, the director was stopped in the direction perpendicular to the grooves, and the driving by the simple matrix was impossible.

(3) Determination of Orientation Direction by Surface Shape of Orientation Film

The factors for the orientation and the switching operation are considered on the basis of the data as described above. The following has been known. When a material having a rod-shaped molecular structure exists on the surface of the groove 50 structure having a sin-wave section, the surface energy thereof is varied in accordance with the orientation direction of the molecules, and the orientation in the groove direction is more stable than the orientation in the direction perpendicular to the grooves by E represented by the following equation (P. G. De Gennes and J. Prost, The Physics of Liquid Crystals, Second Edition, P108 and Liquid Crystal Dictionary, issued by Baifukan, P189).

$$E = kD^2/A^3$$

(D: depth of grooves, A: pitch of grooves, k: proportional constant)

Accordingly, when $E_1$ represents the stabilization of the surface energy by the orientation of the liquid crystal molecules due to the groove structure according to the present invention and $E_2$ represents the stabilization of the surface energy by the orientation in the step direction (direction perpendicular to the grooves 50) due to the sawtoothed structure, $E_1$ and $E_2$ are assumed to be set as follows:

$$E_1 = k'D_1^2/A_1^3 \qquad \text{equation 1}$$

$$E_2 = k''D_2^2/A_2^3 \qquad \text{equation 2}$$

($D_1$: depth of grooves 50, $D_2$: height of steps of sawtoothed projections 51, $A_1$: pitch of grooves 50, $A_2$: pitch of sawtoothed projections 51, k', K": proportional constant)

From the equations 1 and 2, $R_B$ is defined as follows.

$$R_B = K \cdot E_1/E_2 (K = k''=k') = (D_1^2/A_1^3)/(D_2^2/A_2^3) \qquad \text{equation 3}$$

When each of the values $D_1$, $D_2$, $A_1$ (TP), $A_2$ shown in the tables 2 to 4 are substituted into the equation 3 and $R_B$ thus obtained is plotted, the plot shown in FIG. 47 is obtained. According to the plot, it has been found out that the orientation due to the sawtoothed projections 51 is dominant for $R_B \leq 4.3$, however, the orientation due to the grooves 50 is dominant for $R_B \geq 4.4$. The existence of the threshold value of $R_B$ for the orientation of the liquid crystal means that the assumption as described above is right and that the orientation direction can be controlled by the pitch and depth of the grooves 50 and the steps of the sawtoothed projections 51 of the orientation film.

Figure 48:
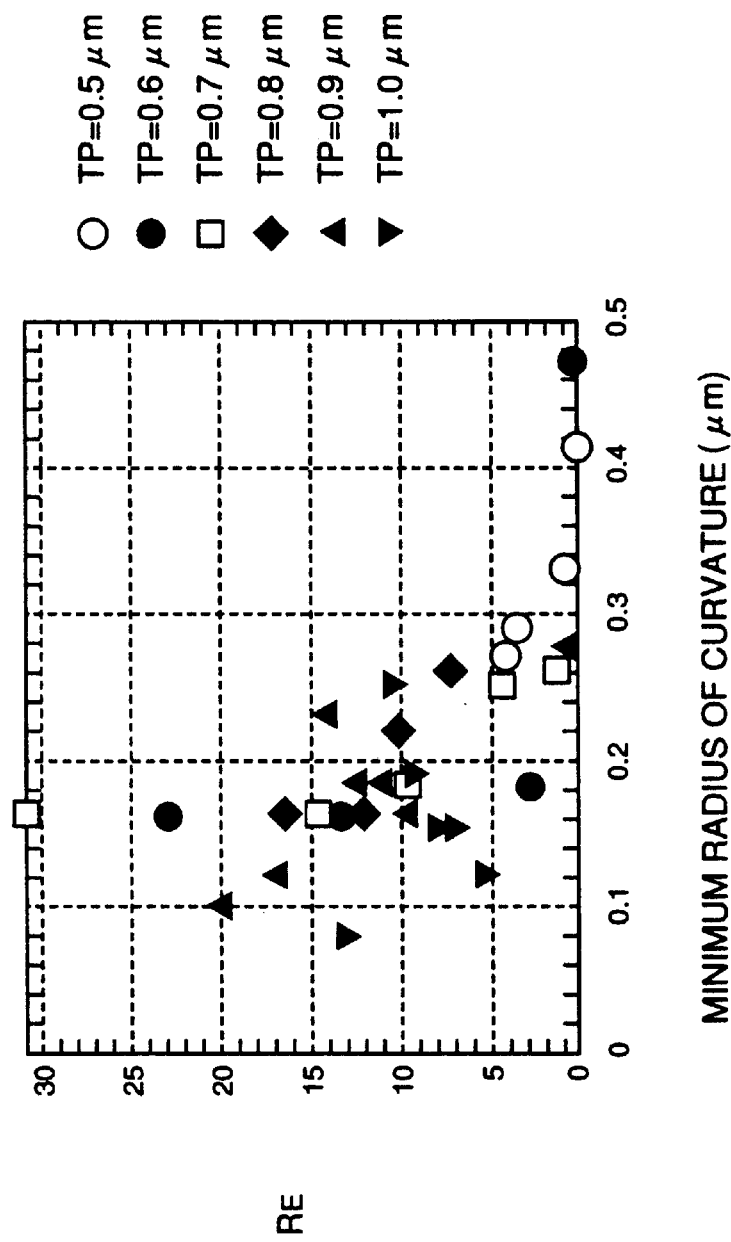
FIG. 48 is a graph showing the relationship between the radius of curvature (r) of the grooves of the orientation film in the liquid crystal display device and $R_E$.

Further, with respect to the radius of curvature r of the recess portions of the grooves 50, the variation of $R_B$ with the radius of curvature r for each groove pitch (TP)=0.5 μm, 0.6 μm, 0.7 μm, 0.8 μm, 0.9 μm, 1.0 μm is plotted. FIG. 48 shows the result. According to this result, it is preferable that the upper limit of r is 0.3 μm or less, particularly 0.2 μm or less.

Further, for the Examples 7 to 28 and the Example 37 in which the orientation due to the groove structure was obtained, the switching characteristic thereof was considered by using the driving waveform shown in FIG. 43. On the condition that $V_{reset} = V_{gray} = 30V$ and $V_{bias} = 10V$, a select pulse time $T_{sw}$ for enabling the switching operation between white and black was measured.

Figure 49:
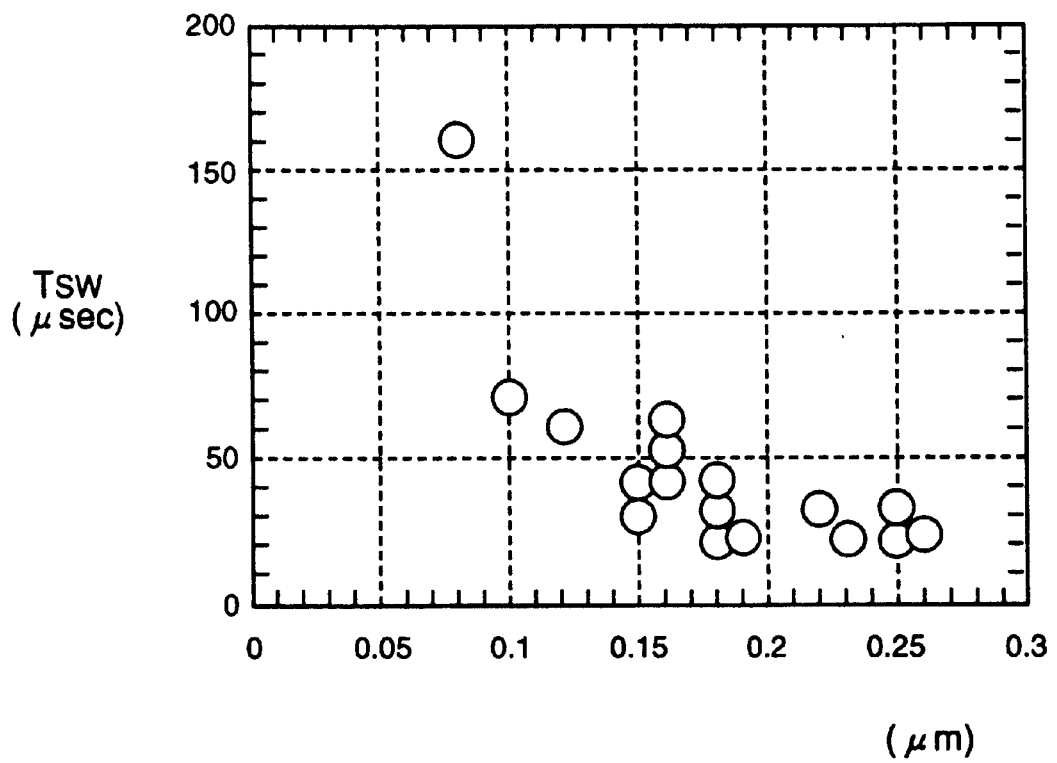
FIG. 49 is a graph showing the relationship between the radius of curvature (r) and the switching time ($T_{SW}$) when the voltage is applied.
Figure 50A:
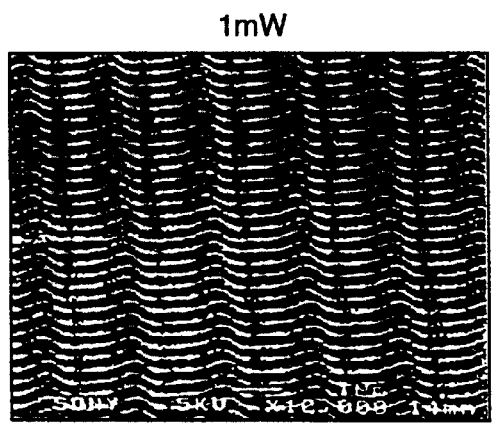
FIGS. 50A through 50D shows SEM images when the pre-tilt angle of the liquid crystal molecules (the height of the sawtoothed projections) are variously varied.
Figure 50C:
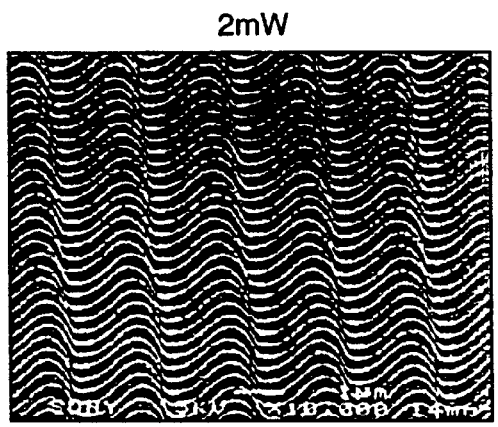
Figure 50B:
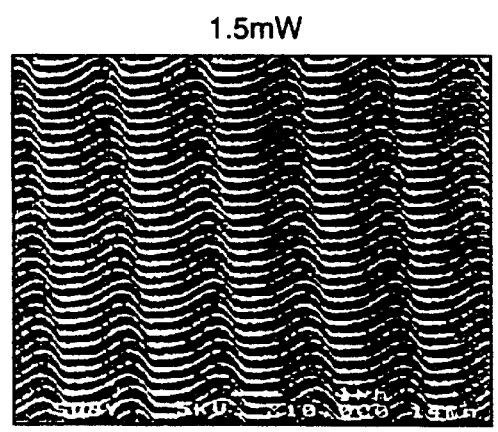
Figure 50D:
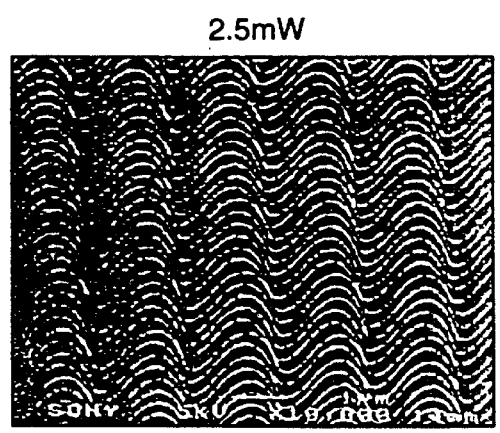

As a result, as shown in FIG. 49, when the minimum radius of curvature of the grooves is above 0.1 μm, $T_{SW}$ is equal to 70 μsec or less, and 240 or more scan lines, that is, 480 or more scan lines for a field in the simple matrix can be obtained during one frame 16.7 mS of NTSC signals. However, it has been found that when the radius of curvature is less than 0.1 μm, $T_{SW}$ is still larger than 70 μsec, and thus the resolution is remarkably reduced if the driving is performed by the simple matrix.

Gradation Display by Dispersion of Tilt Angle of Orientation Film (Example 40)

(1) Principle of Gradation Display in this Example

Through the consideration of the examples up to the Example 28, the surface shape of the orientation film which enables the simple matrix driving and the control of the pre-tilt angle has been clarified. Therefore, in this case, an orientation film having plural pre-tilt angles in one picture element was formed to fabricate a liquid crystal display device.

In order to provide plural pre-tilt angles in one picture element, the following two methods have been considered. That is, a method for keeping the depth of the sawtoothed projections to be fixed while varying the pitch of the sawtoothed projections, and conversely, a method for keeping the pitch of the sawtoothed projections to be fixed while varying the height of the sawtoothed projections. Of course, the plural pre-tilt angles may be produced by varying the both at the same time.

In the Example 40, plural tilt angles were formed on the orientation film to perform the gradation display by keeping the pitch of the sawtoothed projections fixed and varying the depth of the sawtoothed projections.

The following seems to be the cause for occurrence of the gradation in the liquid crystal display device due to the plural tilt angles of the orientation film, that is, the plural pre-tilt angles in one picture element.

As described on the temperature characteristic of the driving operation in the item of the orientation characteristic of the liquid crystal based on the orientation film material as described above, the switching operation of the smectic C phase of the ferroelectric liquid crystal is induced by the interaction between the spontaneous polarization of the liquid crystal and the electric field. The strength of the interaction corresponds to the inner product between the spontaneous polarization and the electric field, and the interaction is suppressed as the pre-tilt angle increases.

Accordingly, when the pre-tilt angle is small, the threshold voltage of the switching operation may be small. As the pre-tilt angle is large, the threshold voltage of the switching operation increases.

The liquid crystal display device using the ferroelectric liquid crystal basically has the two gradations of white and black. However, since plural pre-tilt angles exist in one picture element, threshold voltages which are equal in number to the pre-tilt angles. That is, the gradation display can be performed.

Such a gradation display can be performed by the simple matrix. Since the pre-tilt angle is physically regulated by the shape of the orientation film even when the line number of the electrode is equal to that of a binary display, there is an advantage that the stability is high.

(2) Formation of Liquid Crystal Display Device

In the process of manufacturing the liquid crystal display device, an orientation film having four kinds of pre-tilt angles in one picture element (electrode portion: 280 $\mu$m×280 $\mu$m, inter-electrode pitch: 300 $\mu$m) was formed. FIGS. 50A to 50D shows a SEM image of each stamper corresponding to the shape of the orientation film, and shows the four kinds of tilt angles (the unevenness is reversed in the orientation film). The groove pitch TP was fixed to 0.7 $\mu$m, and the pitch of the sawtoothed projections was fixed to 2.0 $\mu$m. The height of the sawtoothed projections is varied in accordance with the laser power (OVD-005 was used as the orientation film material).

Figure 52:
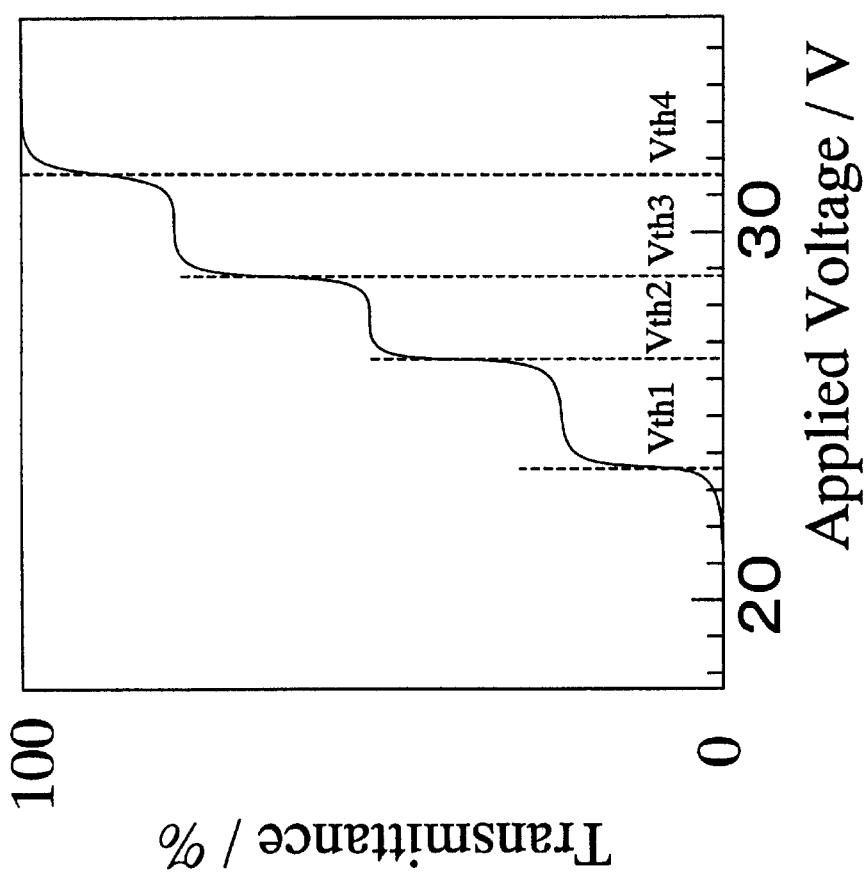
FIG. 52 illustrates the threshold levels described below.

There are four kinds of threshold voltages between 23V and 32V, and five-gradation display can be performed by the simple matrix driving. FIG. 52 illustrates the threshold levels described above.

Liquid Crystal Display Device Having Transparent Electrode on Orientation Film (Examples 41,42)

In the examples as described above, the orientation film existed on ITO (at the liquid crystal side). Accordingly, there is a loss of electric field in the orientation film. Therefore, an example is given in which the orientation film is located below ITO, and the loss of the electric field is small.

Figure 51:
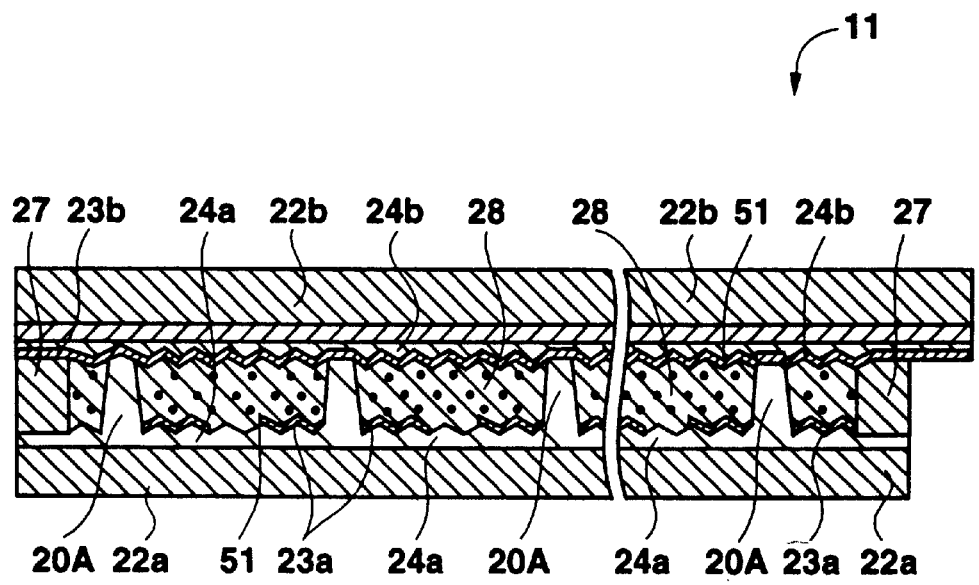
FIG. 51 is a cross-sectional view showing another liquid crystal display device according to the present invention.

In these examples, in order to show that the injection molding method in which the structure for the orientation is directly provided on the substrate (actually, the structure for the orientation was formed by the 2P method) can be directly applied, thermoplastic plastic (acrylic resin, norbornene resin) was used for the substrate. As the device structure, as shown in FIG. 51, an orientation film 24a, 24b (SD-17) having grooves 50 and projections 51, an ITO electrode 23a, 23b, and an insulating film (PVA resin, polyimide resin) not shown in the figures were successively formed on the plastic substrate 22a, 22b. It is preferable that the surface of the electrode 23a, 23b have the surface shape which is matched to the grooves 50 and the projections 51 of the orientation film 24a, 24b. The estimation was made by using a test device having a substrate size of 3 cm×4 cm and an electrode of 1 cm width (1 line).

(1) Example 41

Acrylic resin (heat resistance temperature of 110° C.) was used for the substrate, and after the orientation film was formed, ITO was sputtered at the room temperature (78.3 ohm/cm$^2$, film thickness of 310 nm, transparent). The shape of the orientation film was the same as the Example 10. PVA (polyvinyl alcohol) was used as the insulating film. The PVA film was formed by spin-coating 0.2% solution (methanol solution) at 1000 rmp for 30 seconds. Thereafter, it was annealed at 100° C. for 30 minutes.

(2) Example 42

Norbornene resin (heat resistance temperature of 160° C.) was used for the substrate, and polyimide for low-temperature sintering (sintering 150° C., 1 hour) was used for the insulating film. The other conditions were the same as in the case of the Example 41.

For the driving based on Haltman's waveform, the threshold value of the select voltage was between 10V and 13V in both the examples 41 and 42, and the driving could be performed with a voltage lower than that in the Example 10.

Although the present invention has been described with reference to the above-described examples, it is possible to further modify them on the basis of the technical idea of the present invention.

For example, various modifications may be made on the size and the forming method of the grooves 50 and the projections 51 as described above, and the other means.

An asymmetric triangular waveform shape, a trapezoidal shape, etc. as well as a sawtoothed waveform may be used for the asymmetric structures insofar as these structures are kept in a single shape. The neighboring asymmetric structures may be aligned with one another, however, the orientation force in the direction perpendicular to the orientation grooves of the liquid crystal can be weakened by arranging the structures while slightly displacing the structures or randomly.

The grooves for controlling the orientation may be designed so as to be rectangular, sin-shaped, triangular, trapezoidal or the like in section. This shape is determined by the spot diameter or pitch of the laser beam and the gamma characteristic of the resist. For example, when the grooves are designed to have a rectangular section, the grooves can be obtained by setting the pitch to the double or more of the pitch and using a resist having a sharp gamma characteristic (for example, GX250 produced by Nippon Synthetical Rubber Co., Ltd.). The sin-shape can be obtained by setting the pitch to a smaller value than the spot diameter. The trapezoidal shape can be obtained by using a rectangular resist having an oblique gamma characteristic. The triangular shape can be obtained by combining sin-shaped grooves and rectangular grooves in an intermediate area therebetween.

Various modifications may be made to the kind of the liquid crystal, the material, structure and shape of each part of the liquid crystal device, the fabrication method, etc. It is sufficient that at least one of the substrates 22a and 22b is optically transparent for a display. The projection 20A may be formed like a wall or like projecting wire.

In the examples as described above, the description is made on the liquid crystal device which is suitable as a display device. However, the liquid crystal device is not limited to the display device, and it may be applied to a filter, a shutter, a display screen of an OA equipment, a screen, a phase control device for wobbling, etc.

According to the liquid crystal device of the present invention, in the liquid crystal device in which a pair of substrates each having an electrode and a liquid crystal orientation control layer are disposed so as to confront each other leaving a predetermined gap therebetween and liquid crystal is disposed in the gap, plural grooves are formed on the inner surfaces contacted with the liquid crystal, and the section of the inner surfaces in the direction along the grooves has such a shape that projections each having an asymmetric shape are arranged repetitively. In addition, radius of curvature of the recess portions formed by the grooves in the direction intersecting the grooves is set to 0.1 $\mu$m or more. The orientation regulating force of the liquid crystal molecules due to the grooves can be controlled by the radius of curvature in a specific range, and the switching operation of the liquid crystal molecules can be easily performed. In addition, the liquid crystal molecules are not oriented along the steps of the asymmetric projections such as the sawtoothed structure. The liquid crystal molecules can be oriented at a desired pre-tilt angle along the grooves by the projections. Particularly the ferroelectric liquid crystal is liable to be switched on the conical surface of the cone at a desired cone angle.

According to the liquid crystal device of the present invention, the master for forming the grooves and the projections is formed by the cutting method using laser irradiation.

Accordingly, according to the present invention, there can be provided the liquid crystal device which has excellent characteristics (particularly, a ferroelectric liquid crystal display device has excellent contrast and can be easily designed to a large size), and the method for easily forming the liquid crystal device in a short time and at a low cost. Particularly, by combining it with the ferroelectric liquid crystal, there can be achieved a flat panel display which can be driven by the simple matrix, can be designed to a large size and light weight and with high contrast, can perform an in-pixel gradation display, can be driven with a low voltage, and has high reliability and excellent temperature characteristic.

What is claimed is:

1. A liquid crystal display device, comprising:
    a pair of substrates disposed opposite to each other leaving a predetermined gap therebetween, each of the pair of substrates having an electrode and a liquid crystal orientation control layer, the liquid crystal orientation control layer including an inner surface; and
    a liquid crystal disposed within said gap, the liquid crystal contacting the inner surface of the liquid crystal control layer of each of said substrates, wherein
    a plurality of grooves and repetitive asymmetrical projections are formed on the inner surface of the liquid crystal orientation control layer of each of said substrates and each of said plurality of grooves has a radius of curvature of at least 0.1 $\mu$m;
    a depth $D_1$ of each of said plurality of grooves, a height $D_2$ of each of said asymmetrical projections, a pitch $A_1$ of each of said plurality of grooves, and a pitch $A_2$ of each of said asymmetrical projections are related as follows: $R_E = (D_1^2/A_1^3)/(D_2^2/A_2^3) \geq 4.4$; and
    when a distance between a starting point and a peak point of said each of the asymmetrical projections parallel to said each of the plurality of grooves is expressed by a and a distance between said peak point and a terminating point of said each of the asymmetrical projections is expressed by b and a/b is greater than 1 and equal to or less than 2, and
    wherein the liquid crystal is of a ferroelectric type.

2. The liquid crystal display device according to claim 1, wherein the radius of curvature of each of said plurality of grooves is between about 0.1 $\mu$m and 0.3 $\mu$m.

3. The liquid crystal display device according to claim 1, wherein the inner surface of the liquid crystal orientation control layer of each of said pair of substrates has a sawtoothed topography.

4. The liquid crystal display device according to claim 1, wherein the inner surface of said liquid crystal orientation control layer of each of said pair of substrates contacting a liquid crystal composition and said liquid crystal composition form a contact angle greater than 0° and less than 17 degrees.

5. The liquid crystal display device according to claim 4, wherein the inner surface of said liquid crystal orientation control layer contacting the liquid crystal composition are subjected to ultraviolet ray irradiation of short wavelength.

6. The liquid crystal display device according to claim 4, wherein the inner surface of the liquid crystal orientation control layer contacting the liquid crystal composition is subjected to coupling.

7. The liquid crystal display device according to claim 1, further comprising a single picture element having at least two pre-tilt angles.

8. The liquid crystal display device according to claim 1, wherein said electrode is formed on said inner surface of said liquid crystal orientation control layer on each of said substrates.

9. The liquid crystal display device according to claim 1, wherein at least one pillar-shaped projection for keeping the gap between said pair of substrates extends between said pair of substrates.

10. The liquid crystal display device according to claim 9, wherein said at least one pillar-shaped projection is provided on the inner surface of the liquid crystal orientation control layer of one of the substrates of said pair of substrates.

11. The liquid crystal display device according to claim 1, further comprising:
    at least two picture elements; and
    at least one separation wall on an inner surface of at least one substrate of said pair of substrates separates each of the at least two picture elements.

12. The liquid crystal display device according to claim 1, wherein at least one wall-shaped projection for keeping the gap between said pair of substrates extends between said pair of substrates.

13. The liquid crystal display device according to claim 12, wherein said at least one wall-shaped projection is provided on the inner surface of the liquid crystal orientation control layer of one of the substrates of said pair of substrates.

14. A method for manufacturing a liquid crystal display device, the method comprising the steps of:
    disposing a pair of substrates opposite to each other leaving a predetermined gap therebetween, each having an electrode and a liquid crystal orientation control layer, the liquid crystal orientation control layer having an inner surface;
    disposing a liquid crystal within said gap and contacting the liquid crystal with the inner surface of the liquid crystal orientation control layer of each of said substrates;
    forming a plurality of grooves, each of the plurality of grooves having a radius of curvature of at least 0.1 $\mu$m, and repetitive asymmetrical projections on each inner surface of the orientation control layer of each of said substrates in which a depth $D_1$ of each of said plurality of grooves, a height $D_2$ of each of said asymmetrical projections, a pitch $A_1$ of each of said plurality of grooves, and a pitch $A_2$ of each of said asymmetrical projections are related as follows: $R_E = (D_1^2/A_1^3)/(D_2^2/A_2^3) \geq 4.4$, and when a distance between a starting point and a peak point of said each of the asymmetrical projections parallel to said each of the plurality of grooves is expressed by a and a distance between said peak point and a terminating point of said each of the asymmetrical projections is expressed by b and a/b is greater than 1 and equal to or less than 2, and
    wherein the liquid crystal is of a ferroelectric type.

15. The method according to claim 14, further comprising the step of:

forming said plurality of grooves and said asymmetrical projections on said inner surfaces of said respective liquid crystal orientation control layers of said pair of substrates by contacting said inner surfaces to a surface of a master.

16. The method according to claim 15, further comprising the step of:

transferring a surface shape of said master onto the inner surface of said liquid crystal orientation control layer.

* * * * *